US010268113B2

(12) United States Patent
Uehara et al.

(10) Patent No.: US 10,268,113 B2
(45) Date of Patent: Apr. 23, 2019

(54) ILLUMINATION DEVICE AND PROJECTOR HAVING LIGHT SHAPING OPTICAL SYSTEM INCLUDING FREE-FORM SURFACE

(71) Applicant: SEIKO EPSON CORPORATION, Tokyo (JP)

(72) Inventors: Katsuyuki Uehara, Azumino (JP); Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/872,868

(22) Filed: Jan. 16, 2018

(65) Prior Publication Data

US 2018/0210328 A1 Jul. 26, 2018

(30) Foreign Application Priority Data

Jan. 23, 2017 (JP) .................. 2017-009613
Aug. 2, 2017 (JP) .................. 2017-150294

(51) Int. Cl.
*G03B 21/20* (2006.01)
*F21K 9/64* (2016.01)
(Continued)

(52) U.S. Cl.
CPC .............. *G03B 21/208* (2013.01); *F21K 9/64* (2016.08); *F21V 13/02* (2013.01);
(Continued)

(58) Field of Classification Search
CPC ....... G03B 21/204; G03B 21/208; F21K 9/64; F21V 13/02; G02B 27/0927; G02B 27/0961
See application file for complete search history.

(56) References Cited

U.S. PATENT DOCUMENTS 8,985,783 B2 3/2015 Kurosaki
9,513,539 B2 12/2016 Kurosaki
(Continued)

FOREIGN PATENT DOCUMENTS

JP 2003-121777 A 4/2003
JP 2005-208571 A 8/2005
(Continued)

OTHER PUBLICATIONS

May 24, 2018 Extended Search Report issued in European Patent Application No. 18152719.3.

*Primary Examiner* — Sultan Chowdhury
*Assistant Examiner* — Magda Cruz
(74) *Attorney, Agent, or Firm* — Oliff PLC

(57) ABSTRACT

An illumination device is provided with a light source device including a first light-emitting element that emits a first pencil of rays, and a light shaping optical system including a first lens surface on which the first pencil of rays is incident. The first lens surface has a first free-form surface represented by Expression (1) in which x and y are used as variables. In Expression (1), in a case where h is set to a positive integer, the coefficient $C_j$ of the $x^{2h}$ term is different from the coefficient $C_j$ of the $y^{2h}$ term.

$$z = \frac{cr^2}{1+\sqrt{1-(1+k)c^2r^2}} + \sum_{j=2}^{s} c_j x^m y^n \quad (1)$$

20 Claims, 13 Drawing Sheets

(51) Int. Cl.
*F21V 13/02* (2006.01)
*G02B 27/09* (2006.01)

(52) U.S. Cl.
CPC ..... *G02B 27/0927* (2013.01); *G02B 27/0961* (2013.01); *G03B 21/204* (2013.01)

(56) References Cited

U.S. PATENT DOCUMENTS

| | | | |
|---|---|---|---|
| 2007/0153521 A1* | 7/2007 | Konuma | G03B 27/545 |
| | | | 362/268 |
| 2011/0234998 A1 | 9/2011 | Kurosaki | |
| 2015/0168820 A1 | 6/2015 | Kurosaki | |
| 2015/0362725 A1 | 12/2015 | Zhu et al. | |

FOREIGN PATENT DOCUMENTS

| | | |
|---|---|---|
| JP | 2011-107358 A | 6/2011 |
| JP | 2011-197597 A | 10/2011 |
| JP | 2013-182717 A | 9/2013 |
| JP | 2014-138148 A | 7/2014 |

* cited by examiner

ILLUMINATION DEVICE AND PROJECTOR HAVING LIGHT SHAPING OPTICAL SYSTEM INCLUDING FREE-FORM SURFACE

BACKGROUND

1. Technical Field

The present invention relates to an illumination device and a projector.

2. Related Art

In recent years, in an illumination device for a projector, a technique has been known in which the illuminance distribution of an excitation light spot is made uniform by disposing a diffusion plate in a condensing optical system disposed between a light source for excitation and a phosphor (see, for example, JP-A-2011-197597).

In addition, in a projector, a technique has also been known in which the illuminance distribution of an excitation light spot is made uniform by using two multi-lenses (see, for example, JP-A-2014-138148).

However, in the related art disclosed in JP-A-2011-197597, since the excitation light spot is large, there is a problem in that fluorescence generated in a phosphor is not efficiently incorporated into a subsequent-stage optical system, and that light use efficiency decreases. In addition, according to the related art disclosed in JP-A-2014-138148, the uniformity of the illuminance distribution is made higher than in a case where the diffusion plate is used, but there is a problem in that an increase in the number of components is caused due to two multi-lenses being used.

SUMMARY

An advantage of some aspects of the invention is to provide an illumination device which is capable of uniformizing an illuminance distribution in a region to be illuminated with a small number of components. Another advantage of some aspects of the invention is to provide a projector including the illumination device.

According to a first aspect of the invention, an illumination device is provided. The illumination device includes: a light source device including a first light-emitting element that emits a first pencil of rays; and a light shaping optical system including a first lens surface on which the first pencil of rays is incident, wherein the first lens surface includes a first free-form surface represented by Expression (1) in which x and y are used as variables, and in a case where h is set to a positive integer in the Expression (1), a $C_j$ coefficient of an $x^{2h}$ term is different from a coefficient $C_j$ of a $y^{2h}$ term.

$$z = \frac{cr^2}{1+\sqrt{1-(1+k)c^2r^2}} + \sum_{j=2}^{s} c_j x^m y^n \quad (1)$$

In the illumination device according to the first aspect, it is possible to form a spot of the first pencil of rays, formed on a region to be illuminated, in a rectangular shape, and to make the illuminance distribution of the spot uniform. Therefore, it is possible to further reduce the number of components than in a mode in which two multi-lens arrays of the related art are used. In addition, since curvatures in an x direction and a y direction can be independently designed by using Expression (1), the design of a lens is facilitated.

In the first aspect, it is preferable that Expression (1) includes at least one of a first-order term of x and a first-order term of y, and that the Expression includes at least one $x^p y^q$ term, in a case where p and q are set to positive integers.

According to such a configuration, it is possible to deflect the direction of travel of the first pencil of rays. In addition, it is possible to correct distortion occurring in a case where the direction of travel of the first pencil of rays is deflected.

In the first aspect, it is preferable that the light shaping optical system further includes a refractive surface that deflects a direction of travel of the first pencil of rays, and that Expression (1) includes at least one $x^p y^q$ term, in a case where p and q are set to positive integers.

According to such a configuration, it is possible to correct distortion in a case where the direction of travel of the first pencil of rays is deflected by the refractive surface.

In the first aspect, it is preferable that a polynomial expression of Expression (1) is constituted by an even-ordered term of x and an even-ordered term of y.

According to such a configuration, the shape design of the first lens is facilitated.

In the first aspect, it is preferable that the refractive surface is a plane surface.

According to such a configuration, it is possible to deflect the direction of travel of the first pencil of rays with a simple configuration.

In the first aspect, it is preferable that the light shaping optical system further includes a reflection surface that reflects the first pencil of rays and deflects a direction of travel of the first pencil of rays, and that Expression (1) includes at least one $x^p y^q$ term, in a case where p and q are set to positive integers.

According to such a configuration, it is possible to correct distortion in a case where the direction of travel of the first pencil of rays is deflected by the reflection surface.

In the first aspect, it is preferable that a polynomial expression of Expression (1) is constituted by an even-ordered term of x and an even-ordered term of y.

According to such a configuration, the shape design of the first lens is facilitated.

In the first aspect, it is preferable that the light shaping optical system has a light incident surface and a light emission surface, one of the light incident surface and the light emission surface is constituted by the first lens surface, and that a principal ray of light of the first pencil of rays is incident on the other of the light incident surface and the light emission surface in a surface normal direction.

According to such a configuration, when being incident on the light incident surface, or when emitted from the light emission surface, the principal ray of light of the first pencil of rays can be prevented from being deflected. Thereby, it is possible to reduce a variation in the direction of travel due to the deflection of the principal ray of light of the first pencil of rays.

In the first aspect, it is preferable to further include a condensing lens provided on an optical path of the first pencil of rays between the first light-emitting element and the first lens surface.

According to such a configuration, since the divergence angle of the first pencil of rays can be adjusted, the design conditions of the first lens are alleviated.

In the first aspect, it is preferable to further include a wavelength conversion element on which the first pencil of rays transmitted through the light shaping optical system is incident.

According to such a configuration, it is possible to generate fluorescent light with high efficiency using the first pencil of rays having high uniformity of an illuminance distribution.

In the first aspect, it is preferable that the light source device further includes a second light-emitting element that emits a second pencil of rays, the light shaping optical system further includes a second lens surface on which the second pencil of rays is incident, the second lens surface has a second free-form surface which is represented by Expression (1), the coefficient $C_j$ of the $x^{2h}$ term is different from the coefficient $C_j$ of the $y^{2h}$ term, with respect to the second free-form surface, and that the light shaping optical system is configured to illuminate a region to be illuminated with the first pencil of rays and the second pencil of rays in a superposition manner.

According to such a configuration, since the first pencil of rays and the second pencil of rays can be caused to superpose each other, it is possible to further improve the uniformity of the illuminance distribution of the region to be illuminated.

In the first aspect, it is preferable to further include a light source control device that controls an output of the first light-emitting element independently of an output of the second light-emitting element.

According to such a configuration, it is possible to adjust the illuminance of the entire region to be illuminated by controlling the output of the first light-emitting element.

In the first aspect, it is preferable to further include a condensing lens provided on an optical path of the first pencil of rays between the first light-emitting element and the first lens surface.

According to such a configuration, since the divergence angle of the first pencil of rays can be adjusted, the design conditions of the first lens are alleviated.

In the first aspect, it is preferable to further include a wavelength conversion element, and preferable that a predetermined region of the wavelength conversion element is equivalent to the region to be illuminated.

According to such a configuration, it is possible to generate fluorescent light with high efficiency using light of an illuminance distribution having high uniformity.

In the first aspect, it is preferable that the light source device further includes a second light-emitting element that emits a second pencil of rays, the light shaping optical system further includes a second lens surface on which the second pencil of rays is incident, the second lens surface has a second free-form surface which is represented by Expression (1), the coefficient $C_j$ of the $x^{2h}$ term is different from the coefficient $C_j$ of the $y^{2h}$ term, with respect to the second free-form surface, and the light shaping optical system is configured to cause the first pencil of rays and the second pencil of rays to be incident on regions to be illuminated which are different from each other.

According to such a configuration, it is possible to illuminate a region to be illuminated having any size with a uniform illuminance distribution.

In the first aspect, it is preferable to further include a light source control device that controls an output of the first light-emitting element independently of an output of the second light-emitting element.

According to such a configuration, it is possible to improve the uniformity of the illuminance distribution of the region to be illuminated. In addition, it is possible to set the illuminance distribution of the region to be illuminated to a desired distribution.

In the first aspect, it is preferable to further include a wavelength conversion element, and preferable that a predetermined region of the wavelength conversion element is equivalent to the region to be illuminated.

According to such a configuration, it is possible to generate fluorescent light with high efficiency using light of an illuminance distribution having high uniformity.

According to a second aspect of the invention, a projector is provided. The projector includes: the illumination device of the first aspect; a light modulating device that modulates illumination light emitted from the illumination device in accordance with image information and generates image light; and a projection optical system that projects the image light, wherein an image forming region of the light modulating device is equivalent to the region to be illuminated.

In the projector according to the second aspect, it is possible to illuminate the image forming region of the light modulating device with a uniform illuminance distribution. Thus, it is possible to display an image having a reduction in the non-uniformity of brightness.

According to a third aspect of the invention, a projector is provided. The projector includes: the illumination device of the first aspect; a light modulating device that modulates illumination light from the light source device in accordance with image information and generates image light; and a projection optical system that projects the image light, in which the light source device further includes a third light-emitting element that emits a third pencil of rays, the light shaping optical system further includes a third lens surface on which the third pencil of rays is incident, the third lens surface has a third free-form surface which is represented by Expression (1), the coefficient $C_j$ of the $x^{2h}$ term is different from the coefficient $C_j$ of the $y^{2h}$ term, with respect to the third free-form surface, the light shaping optical system is configured to illuminate an entirety of the region to be illuminated with the third pencil of rays, the light source control device is configured to control an output of the third light-emitting element independently of at least one of an output of the first light-emitting element and an output of the second light-emitting element, and an image forming region of the light modulating device is equivalent to the region to be illuminated.

In the projector according to the third aspect, it is possible to set the image forming region of the light modulating device to have a desired illuminance distribution by controlling the output of the third light-emitting element independently of at least one of the output of the first light-emitting element and the output of the second light-emitting element.

According to a fourth aspect of the invention, a projector is provided. The projector includes: the illumination device of the first aspect; a light modulating device that modulates illumination light from the wavelength conversion element and generates image light in accordance with image information; and a projection optical system that projects the image light.

In the projector according to the fourth aspect, it is possible to display a bright image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
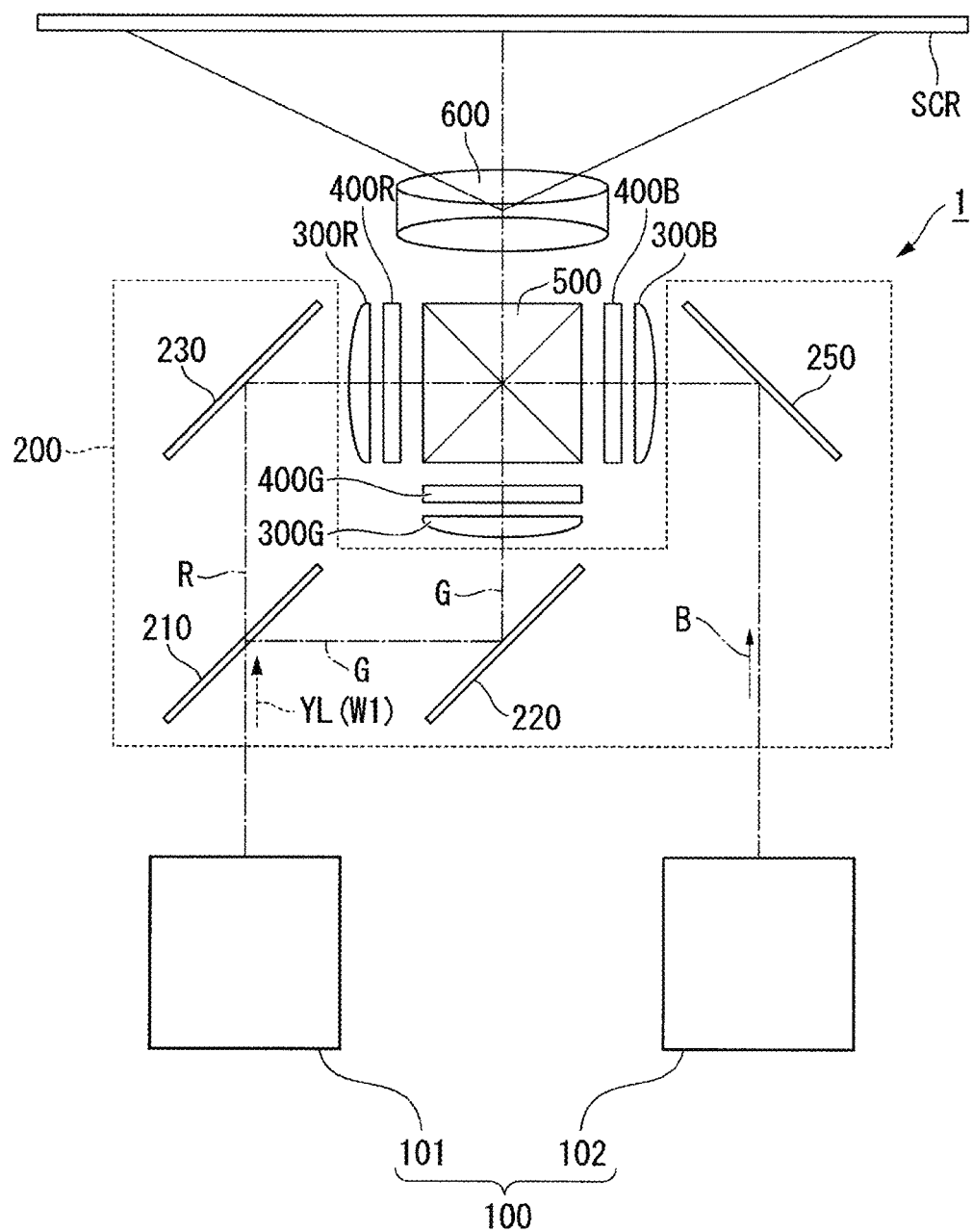
FIG. 1 is a schematic diagram illustrating an optical system of a projector according to a first embodiment.

Hereinafter, embodiments of the invention will be described in detail with reference to the accompanying drawings.

In the drawings used in the following description, the featuring portions of the present application may be enlarged, for convenience, in order to make the features thereof easier to understand, and the dimension ratios and the like for each of the components are not necessarily the same as those in reality.

First Embodiment

FIG. 1 is a schematic diagram illustrating an optical system of a projector according to the present embodiment.

As shown in FIG. 1, a projector 1 includes an illumination device 100, a color separation light guide optical system 200, a liquid crystal light modulating device 400R, a liquid crystal light modulating device 400G, a liquid crystal light modulating device 400B, a cross dichroic prism 500, and a projection optical system 600.

The illumination device 100 includes a first illumination device 101 and a second illumination device 102. The first illumination device 101 emits illumination light W1 (fluorescent light YL) including red light and green light toward the color separation light guide optical system 200. The second illumination device 102 emits blue light B toward the color separation light guide optical system 200.

The color separation light guide optical system 200 includes a dichroic mirror 210, a reflection mirror 220, a reflection mirror 230, and a reflection mirror 250. The color separation light guide optical system 200 separates the illumination light W1 emitted from the first illumination device 101 into red light R and green light G, and guides the separated beams of light to the liquid crystal light modulating device 400R and the liquid crystal light modulating device 400G corresponding thereto. In addition, the color separation light guide optical system 200 guides the blue light B emitted from the second illumination device 102 to the liquid crystal light modulating device 400B. A field lens 300R, a field lens 300G, and a field lens 300B are disposed between the color separation light guide optical system 200 and the liquid crystal light modulating device 400R, the liquid crystal light modulating device 400G, and the liquid crystal light modulating device 400B.

The dichroic mirror 210 is a dichroic mirror that transmits a red light component, and reflects a green light component. The reflection mirror 220 is a mirror that reflects the green light component. The reflection mirror 230 is a mirror that reflects the red light component. The reflection mirror 250 is a reflection mirror that reflects a blue light component.

The red light R transmitted through the dichroic mirror 210 is reflected from the reflection mirror 230, and is incident on an image forming region of the liquid crystal light modulating device 400R for red light through the field lens 300R. The green light G reflected from the dichroic mirror 210 is further reflected from the reflection mirror 220, and is incident on an image forming region of the liquid crystal light modulating device 400G for green light through the field lens 300G. The blue light B reflected from the reflection mirror 250 is incident on an image forming region of the liquid crystal light modulating device 400B for blue light through the field lens 300B.

The liquid crystal light modulating device 400R, the liquid crystal light modulating device 400G, and the liquid crystal light modulating device 400B modulate the incident beams of color light in accordance with image information, and form image light corresponding to each color.

Although not shown in the drawing, incident-side polarizing plates are respectively disposed on the light incident sides of the liquid crystal light modulating device 400R, the liquid crystal light modulating device 400G, and the liquid crystal light modulating device 400B. Emission-side polarizing plates are respectively disposed on the light emission sides of the liquid crystal light modulating device 400R, the liquid crystal light modulating device 400G, and the liquid crystal light modulating device 400B.

The cross dichroic prism 500 forms a color image by synthesizing the respective beams of image light emitted from the liquid crystal light modulating device 400R, the liquid crystal light modulating device 400G, and the liquid crystal light modulating device 400B. The cross dichroic prism 500 is formed in an approximately square shape when seen in a plan view in which four right-angle prisms are bonded to each other, and has dielectric multilayer films formed on an approximately X-shaped interface where the right-angle prisms are bonded to each other.

The color image emitted from the cross dichroic prism 500 is extendedly projected onto a screen SCR by the projection optical system 600.

Subsequently, the configuration of the illumination device 100 will be described.

Figure 2:
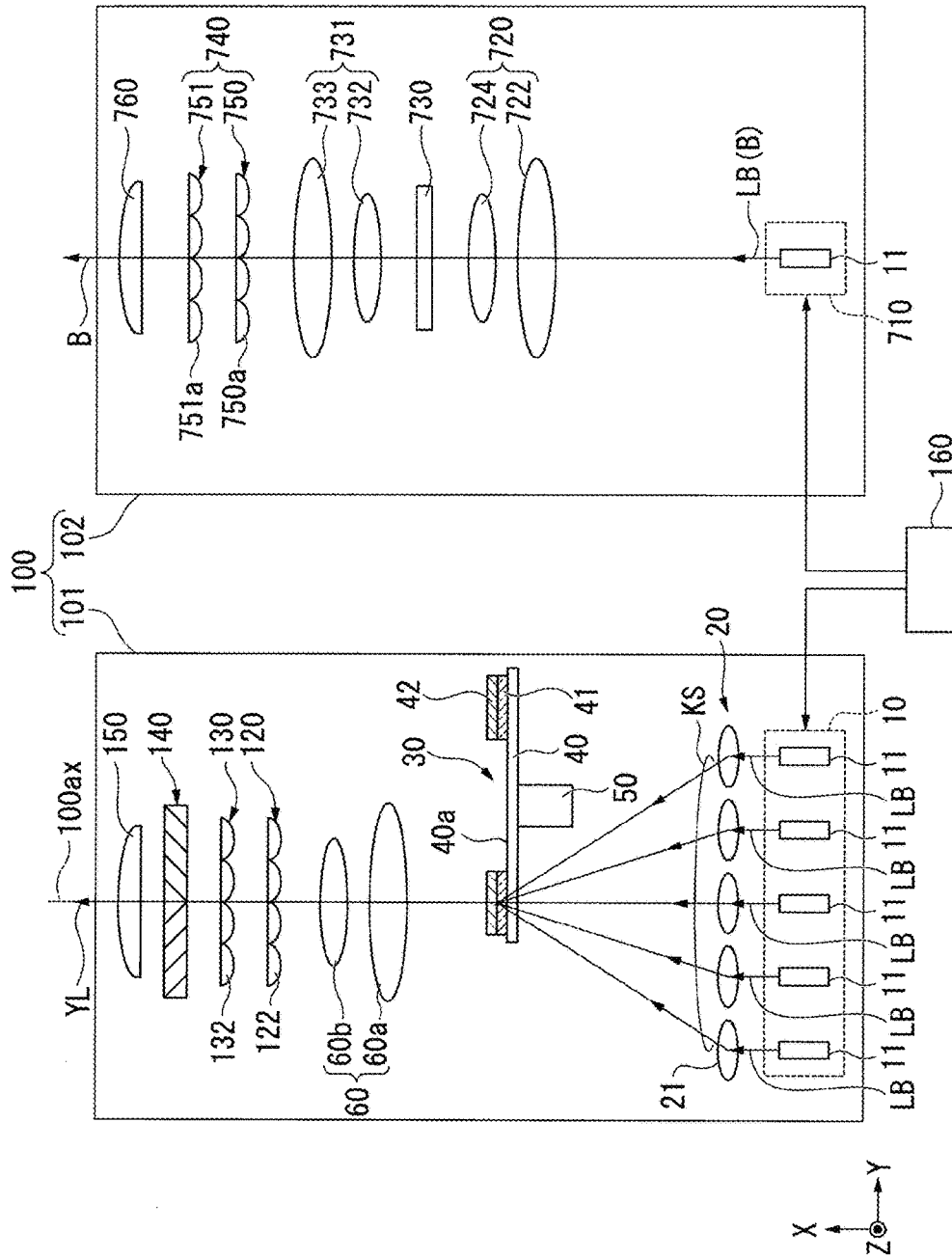
FIG. 2 is a diagram illustrating a schematic configuration of an illumination device.

FIG. 2 is a diagram illustrating a schematic configuration of the illumination device 100. As shown in FIG. 2, the first illumination device 101 includes a first light source device 10, a light shaping optical system 20, a rotary fluorescent plate 30, a pickup optical system 60, a first lens array 120, a second lens array 130, a polarization conversion element 140, a superposition lens 150, and a control device 160.

The first light source device 10 includes a plurality of semiconductor lasers 11 that emit a blue laser beam (for example, light of which the peak of emission intensity is approximately 445 nm) LB as excitation light. An example of the semiconductor laser 11 to be used may include a laser that emits a blue laser beam having a wavelength except 445 nm, for example, a wavelength of 460 nm.

Hereinafter, a description is occasionally given, as necessary, using an XYZ coordinate system in the drawings. An X direction is a direction along an illumination optical axis 100ax, a Z direction is a direction along a vertical direction, and a Y direction is a direction orthogonal to the X direction and the Z direction.

In the present embodiment, the plurality of semiconductor lasers 11 are arranged two-dimensionally. Specifically, the plurality of semiconductor lasers 11 are arranged in a matrix (for example, five rows in the Y direction and five columns in the Z direction in FIG. 2) in an in-plane perpendicular to the illumination optical axis 100ax (in-plane parallel to a YZ plane). FIG. 2 shows only one row's worth of semiconductor lasers 11 among the plurality of semiconductor lasers 11. The first light source device 10 emits excitation light KS constituted by a plurality of laser beams LB.

The plurality of semiconductor lasers 11 are electrically connected to the control device 160. The control device 160 can independently control an output of each laser beam LB, for example, by controlling a current value supplied to each of the plurality of semiconductor lasers 11. The control device 160 corresponds to a "light source control device" in the appended claims.

The excitation light KS emitted from the first light source device 10 is incident on the rotary fluorescent plate through the light shaping optical system 20. The configuration of the light shaping optical system 20 will be described later.

The rotary fluorescent plate 30 includes a motor 50, a base member 40, a dichroic layer 41, and a phosphor layer 42. The rotary fluorescent plate 30 emits the fluorescent light YL toward a side opposite to a side on which the excitation light KS constituted by blue light is incident. That is, the rotary fluorescent plate 30 is a transmission-type rotary fluorescent plate.

The base member 40 is constituted by a material such as, for example glass, quartz, or a sapphire which has a light-transmissive property. The base member 40 is configured to be capable of being rotated around its rotational axis by the motor 50. The base member 40 is a plate body which is circular in planar shape.

The phosphor layer 42 is configured to include an inorganic phosphor material which is annular in planar shape. An example of the phosphor layer 42 to be used includes a phosphor layer in which phosphor particles that emit yellow fluorescent light are dispersed into an inorganic binder such as alumina, a phosphor layer in which phosphor particles are sintered without using the binder, or the like. The phosphor layer 42 is provided around its rotational axis on one surface 40a side of the base member 40. In the present embodiment, the phosphor layer 42 corresponds to a "wavelength conversion element" in the appended claims.

Generally, as the intensity of excitation light incident on the phosphor layer 42 becomes larger, the efficiency of conversion of the excitation light into fluorescence in the phosphor layer decreases. Consequently, in a case where the illuminance distribution of the excitation light is made uniform, local irradiation with intensive excitation light can be prevented from occurring, and thus the fluorescent light YL can be generated with high efficiency.

The first illumination device 101 of the present embodiment uses the light shaping optical system 20, to thereby cause the excitation light KS (each laser beam LB) to be incident on the phosphor layer 42 so as to uniformize the illuminance distribution of a predetermined region (region to be illuminated) of the phosphor layer 42.

Hereinafter, a specific configuration of the light shaping optical system 20 will be described.

Figure 3:
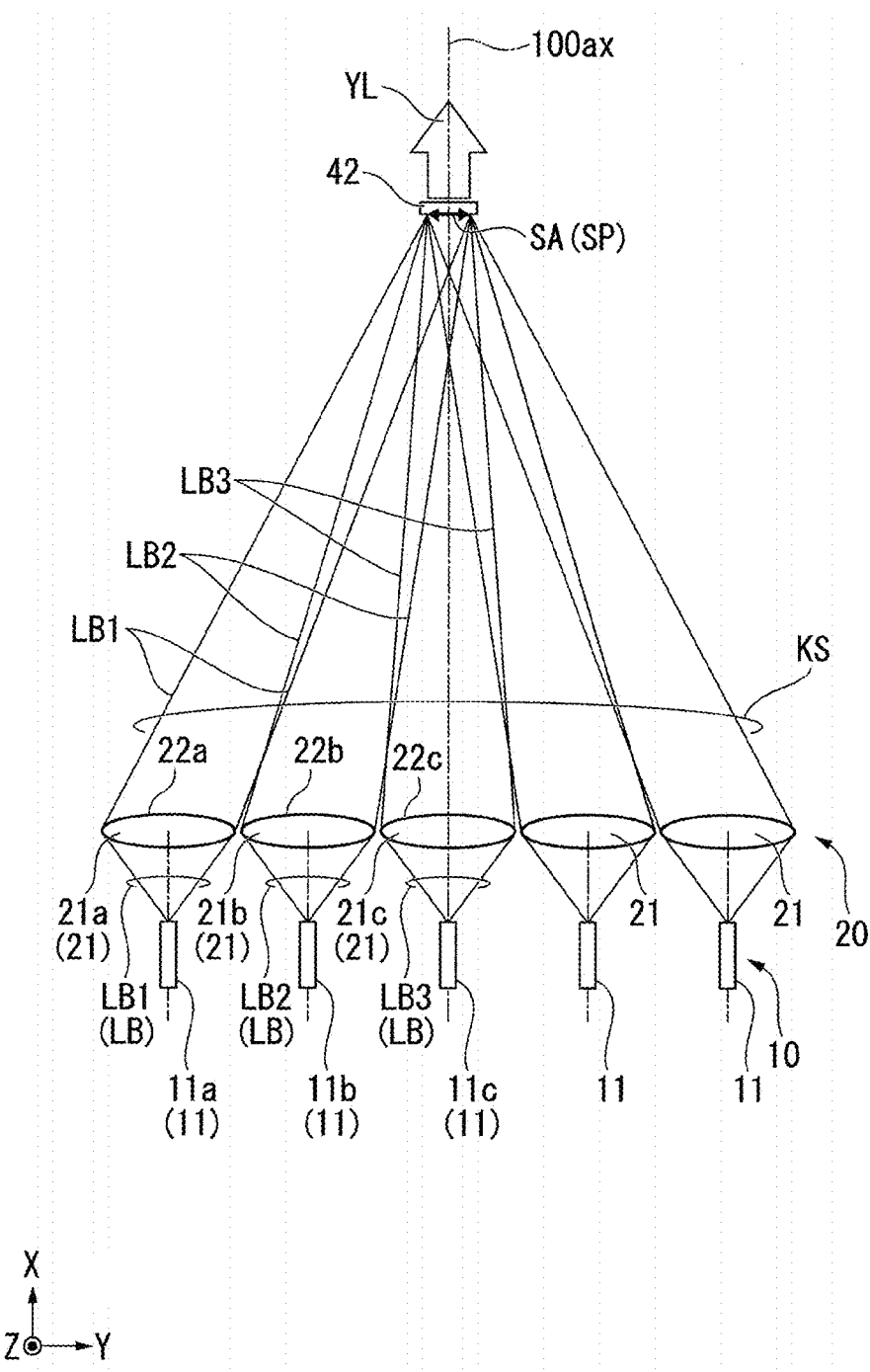
FIG. 3 is a diagram illustrating main components of a light shaping optical system.

FIG. 3 is a diagram illustrating a configuration of the light shaping optical system 20. For convenience for description, FIG. 3 shows only the phosphor layer 42 of the rotary fluorescent plate 30 which is illuminated with the excitation light KS. In addition, FIG. 3 shows only the semiconductor lasers 11 of the third column among the plurality of semiconductor lasers 11. As shown in FIG. 3, the light shaping optical system 20 is provided on the light emission side of the first light source device 10, and is configured such that light emitted from the first light source device 10 is incident thereon.

The plurality of semiconductor lasers 11 includes a first semiconductor laser 11a, a second semiconductor laser 11b, and a third semiconductor laser 11c. Hereinafter, a laser beam LB emitted from the first semiconductor laser 11a is called a laser beam LB1, a laser beam LB emitted from the second semiconductor laser 11b is called a laser beam LB2, and a laser beam LB emitted from the third semiconductor laser 11c is called a laser beam LB3.

The first light source device 10 corresponds to a "light source device" in the appended claims, the first semiconductor laser 11a corresponds to a "first light-emitting element" in the appended claims, the second semiconductor laser 11b corresponds to "second light-emitting element" in the appended claims, and the third semiconductor laser 11c corresponds to "third light-emitting element" in the appended claims.

In addition, the laser beam LB1 corresponds to a "first pencil of rays" in the appended claims, the laser beam LB2 corresponds to a "second pencil of rays" in the appended claims, and the laser beam LB3 corresponds to a "third pencil of rays" in the appended claims.

The light shaping optical system 20 includes a plurality of lenses 21 arranged in an array. Each of the plurality of lenses 21 is disposed corresponding to one of the plurality of semiconductor lasers 11. That is, the plurality of lenses 21 are arranged in a matrix (for example, five rows in the Y direction and five columns in the Z direction in FIG. 3). FIG. 3 shows only the lenses 21 corresponding to the semiconductor lasers 11 of the third column.

In the following description, the optical path of the laser beam LB emitted from each of the plurality of semiconductor lasers 11 constituting the same column (third column), that is, the laser beam LB in an in-plane parallel to an XY plane will be described by way of example.

In the present embodiment, the light shaping optical system 20 is configured to illuminate a predetermined region of the phosphor layer 42 with the laser beams LB emitted from the plurality of semiconductor lasers 11 in a superposition manner. The wording "the laser beams LB superpose each other" refers to a state where spots of the respective laser beams LB generally overlap each other.

In the present embodiment, spots SP of the respective laser beams LB superpose each other in a predetermined region on the phosphor layer 42. The region in which the spots SP of the respective laser beams LB superpose each other is equivalent to a region SA to be illuminated in the phosphor layer 42.

The plurality of lenses 21 includes a first lens 21a, a second lens 21b, and a third lens 21c. The first lens 21a corresponds to the first semiconductor laser 11a, the second lens 21b corresponds to the second semiconductor laser 11b, and the third lens 21c corresponds to the third semiconductor laser 11c.

Therefore, the laser beam LB1 emitted from the first semiconductor laser 11a is incident on the first lens 21a, the laser beam LB2 emitted from the second semiconductor laser 11b is incident on the second lens 21b, and the laser beam LB3 emitted from the third semiconductor laser 11c is incident on the third lens 21c.

In the present embodiment, each of the plurality of lenses 21 is constituted by a free-form surface lens having a free-form surface. Each of the plurality of lenses 21 performs the uniformity of an illuminance distribution and the shape of a spot SP corresponding to laser beam LB formed on a region to be illuminated (phosphor layer 42).

Hereinafter, the structure of the first lens 21a out of the plurality of lenses 21 will be described by way of example. The first lens 21a has a first free-form surface 22a, specified by a polynomial expression in which x and y are used as variables, on at least one surface (for example, light emission surface). The first free-form surface 22a is rotationally asymmetrical in shape. Specifically, the first free-form surface 22a is represented by the following Expression (1). In Expression (1), an orthogonal coordinate system is used in which a direction parallel to a principal ray of light of light rays incident on the first free-form surface 22a is set to a z-axis. The light emission surface having the first free-form surface 22a corresponds to a "first lens surface" in the appended claims.

$$z = \frac{cr^2}{1+\sqrt{1-(1+k)c^2r^2}} + \sum_{j=2}^{s} c_j x^m y^n \quad (1)$$

In Expression (1), m and n are integers equal to or greater than 0, k is a conic constant, c is a curvature, $c_j$ is a coefficient of $x^m y^n$, and relations of $j=[(m+n)^2+m+3n]/2+1$, $S=[(m_1+n_1)^2+m_1+3n_1]/2+1$, and $r=(x^2+y^2)^{1/2}$ are established. In addition $m_1$ and $n_1$ are upper limits of m and n.

Regarding the first free-form surface 22a of the first lens 21a, in a case where h is set to a positive integer, the coefficient $C_j$ of the $x^{2h}$ term is different from the coefficient $C_j$ of the $y^{2h}$ term. That is, the polynomial expression includes a $C_j x^{2h}$ term and a $C_k y^{2h}$ term, and a relation of $C_j \neq C_k$ is established. Hereinafter, "the coefficient $C_j$ of the $x^{2h}$ term is different from the coefficient $C_j$ of the $y^{2h}$ term" may also be called a first condition.

Generally, the intensity of a laser beam has a Gaussian distribution. Therefore, an illuminance distribution having low uniformity is formed in a region to be illuminated on which the laser beam is incident. On the other hand, according to the first free-form surface 22a satisfying the first condition, the spot SP of the laser beam LB1 is made rectangular, and the illuminance distribution of the spot SP is made uniform through conversion into a so-called top hat distribution.

In addition, Expression (1) includes at least one of the first-order term of x and the first-order term of y. That is, at least one of the coefficient of x and the coefficient of y is not 0. Hereinafter, "including at least one of the first-order term of x and the first-order term of y" may also be called a second condition.

According to the first free-form surface 22a satisfying such a second condition, the laser beam LB1 can be deflected. Thereby, the spot SP of the laser beam LB1 can be adjusted to a desired position. Thus, as shown in FIG. 3, the laser beam LB1 can be caused to be incident on the phosphor layer 42. Further, since the first free-form surface 22a satisfies the first condition, the region SA to be illuminated which is formed on the phosphor layer 42 is rectangular, and the illuminance distribution caused by the laser beam LB1 is made uniform.

In addition, regarding the first free-form surface 22a, Expression (1) includes at least one $x^p y^q$ term in a case where p and q are set to positive integers. That is, the coefficient of at least one term out of terms obtained by combining x and y is not 0. Hereinafter, "including at least one $x^p y^q$ term" may also be called a third condition.

In a case where the laser beam LB1 is deflected as described above, there is a concern of distortion occurring in the spot SP. On the other hand, the first free-form surface 22a corrects distortion due to deflection by satisfying the third condition. Thereby, the distortion of the region SA to be illuminated is reduced.

As described above, the first lens 21a has the first free-form surface 22a satisfying the first condition to third condition. Therefore, the laser beam LB1 can form a spot SP having a rectangular and uniform illuminance distribution on the phosphor layer 42.

Similarly, the second lens 21b has a second free-form surface 22b on the light emission surface. The second free-form surface 22b is specified by the polynomial expression of Expression (1), and this polynomial expression satisfies the first condition to the third condition described above. Similarly to the laser beam LB1, the laser beam LB2 emitted from the second lens 21b can form a spot SP having a rectangular and uniform illuminance distribution on the phosphor layer 42. The second free-form surface 22b causes the laser beam LB2 and the laser beam LB1 to superpose each other on the phosphor layer 42. The light emission surface having the second free-form surface 22b corresponds to a "second lens surface" in the appended claims.

Similarly, the third lens 21c has a third free-form surface 22c on the light emission surface. The third free-form surface 22c is specified by the polynomial expression of Expression (1), and this polynomial expression satisfies the first condition to the third condition described above. Similarly to the laser beams LB1 and B2, the laser beam LB3 emitted from the third lens 21c forms a spot SP having a rectangular and uniform illuminance distribution on the phosphor layer 42. The light emission surface having the third free-form surface 23a corresponds to a "third lens surface" in the appended claims.

The third free-form surface 22c causes the laser beam LB3 to superpose the laser beam LB1 and the laser beam LB2 on the phosphor layer 42.

Similarly to the first lens 21a, the second lens 21b and the third lens 21c described above, the rest of the plurality of lenses 21 have a free-form surface specified by a polynomial expression satisfying the first condition to the third condition. The laser beam LB emitted from each lens 21 has a rectangular and uniform illuminance distribution on the phosphor layer 42, and forms spots SP superposing each other.

In the above description, the spot formed by the laser beam LB in an in-plane parallel to the XY plane has been described by way of example, but it can be said that the same is true of a spot formed by the laser beam LB emitted from each of the plurality of semiconductor lasers 11 constituting the same row (lined up in the Z direction), that is, the laser beam LB in an in-plane parallel to an XZ plane.

Therefore, the laser beam LB emitted from each of the lenses 21 disposed in a matrix within a plane orthogonal to the illumination optical axis 100ax has a rectangular and uniform illuminance distribution on the phosphor layer 42, and forms spots SP superposing each other.

In this manner, according to the light shaping optical system 20 of the present embodiment, the region SA to be illuminated is formed on the phosphor layer 42 by causing the spots SP of the respective laser beams LB to superpose each other, and thus the illuminance distribution in the region SA to be illuminated has high uniformity. Even in a case where variations occur in the outputs (light amounts of the laser beams LB) of the plurality of semiconductor lasers 11, the phosphor layer 42 can be uniformly illuminated.

In addition, since the light shaping optical system 20 is formed by replacing a collimating lens array having been hitherto used in order to collimate each laser beam LB by the plurality of lenses 21, the number of components can be further reduced than in a configuration in which an illuminance distribution is made uniform using two multi-lenses of the related art.

Therefore, according to the first illumination device 101 of the present embodiment, it is possible to uniformize the illuminance distribution of the region SA to be illuminated which is formed on the phosphor layer 42 with a small number of components. Thus, it is possible to generate the fluorescent light YL with high efficiency.

In addition, since the region SA to be illuminated is formed by causing the rectangular spots SP to superpose each other on the phosphor layer 42, it is possible to prevent an emission region of the fluorescent light YL from increasing. Thus, since the subsequent-stage optical system (pickup optical system 60) can incorporate the fluorescent light YL emitted from the phosphor layer 42 with high efficiency, it is possible to efficiently use the fluorescent light YL.

According to the first illumination device 101 of the present embodiment, the outputs of the respective laser beams LB can also be independently controlled by the control device 160. According to this, it is possible to adjust illuminance in the entire region SA to be illuminated which is formed on the phosphor layer 42.

Referring back to FIG. 2, the fluorescent light YL generated in the rotary fluorescent plate 30 is incident on the pickup optical system 60. The pickup optical system 60 is constituted by, for example, two pickup lenses 60a and 60b. The pickup optical system 60 collimates the fluorescent light YL, and guides the collimated fluorescent light to the first lens array 120.

The first lens array 120 includes a plurality of first small lenses 122 for dividing the fluorescent light YL into a plurality of partial fluxes of light. The plurality of first small lenses 122 are arranged in a matrix within a plane orthogonal to the illumination optical axis 100ax.

The second lens array 130 includes a plurality of second small lenses 132 corresponding to the plurality of first small lenses 122 of the first lens array 120. Together with the subsequent-stage superposition lens 150, the second lens array 130 forms images of the first small lenses 122 of the first lens array 120 in each image forming region of the liquid crystal light modulating device 400R and the liquid crystal light modulating device 400G or in the vicinity thereof. The plurality of second small lenses 132 are arranged in a matrix within a plane orthogonal to the illumination optical axis 100ax.

The polarization conversion element 140 converts respective partial fluxes of light (fluorescent light YL) divided by the first lens array 120 into linear polarized light having an aligned polarization direction.

The superposition lens 150 condenses the respective partial fluxes of light emitted from the polarization conversion element 140, and causes the condensed partial fluxes of light to superpose each other in respective image forming regions of the liquid crystal light modulating device 400R and the liquid crystal light modulating device 400G or in the vicinity thereof. The first lens array 120, the second lens array 130, and the superposition lens 150 constitute an integrator optical system that uniformizes the in-plane light intensity distribution of the fluorescent light YL emitted from the rotary fluorescent plate 30.

On the other hand, the second illumination device 102 includes a second light source device 710, a condensing optical system 720, a scattering plate 730, a pickup optical system 731, a lens integrator optical system 740, and a superposition lens 760.

Similarly to the first light source device 10, the second light source device 710 includes the semiconductor lasers 11 that emit a blue laser beam LB. The number of semiconductor lasers 11 may be one or plural. The second light source device 710 is configured to emit the blue light B constituted by a laser beam. The semiconductor laser 11 of the second light source device 710 is also electrically connected to the control device 160. The control device 160 can control an output of the blue light B by controlling a current value supplied to the semiconductor laser 11.

The condensing optical system 720 includes a first lens 722 and a second lens 724 as shown in FIG. 2. The condensing optical system 720 causes the blue light B to be incident on the scattering plate 730 in a substantially condensed state, as a whole. The first lens 722 and the second lens 724 are each constituted by a convex lens.

The scattering plate 730 scatters the blue light B from the second light source device 710 with a predetermined degree of scattering, and forms the blue light B having alight distribution similar to that of the fluorescent light YL emitted from the rotary fluorescent plate 30. An example of the scattering plate 730 capable of being used includes frosted glass constituted by optical glass.

The pickup optical system 731 includes lenses 732 and 733. Each of the lenses 732 and 733 is constituted by a convex lens. The pickup optical system 731 collimates the blue light B scattered in the scattering plate 730 and causes the collimated blue light to be incident on the lens integrator optical system 740.

The lens integrator optical system 740 includes lens arrays 750 and 751. The lens array 750 includes a plurality of small lens 750a for dividing the blue light B into a plurality of partial fluxes of light. The lens array 751 includes a plurality of small lens 751a corresponding to the plurality of small lens 750a of the lens array 750. Together with the subsequent-stage superposition lens 760, the lens array 751 forms an image of the small lenses 750a of the lens array 750 in the image forming region of the liquid crystal light modulating device 400B or in the vicinity thereof.

In the present embodiment, the blue light B emitted from the second illumination device 102 is reflected from the reflection mirror 250, and is incident on the image forming region of the liquid crystal light modulating device 400B for blue light through the field lens 300B.

As described above, according to the first illumination device 101 of the present embodiment, the illuminance distribution of the region SA to be illuminated on the phosphor layer 42 can be made further rectangular and uniform with a smaller number of components than in a case where two multi-lens arrays are used. Thus, it is possible to generate the fluorescent light YL with high efficiency.

According to the projector 1 of the present embodiment, since the projector is provided with the illumination device 100 including the first illumination device 101, it is possible to display a bright color image on the screen SCR.

Second Embodiment

Subsequently, a projector according to a second embodiment will be described. The present embodiment is different from the first embodiment in the configuration of an illumination device (first illumination device). Hereinafter, the configuration of the illumination device will be mainly described. Common members and components with respect to those in the first embodiment are denoted by the same reference numerals and signs, and thus the detailed description thereof will not be given.

Figure 4:
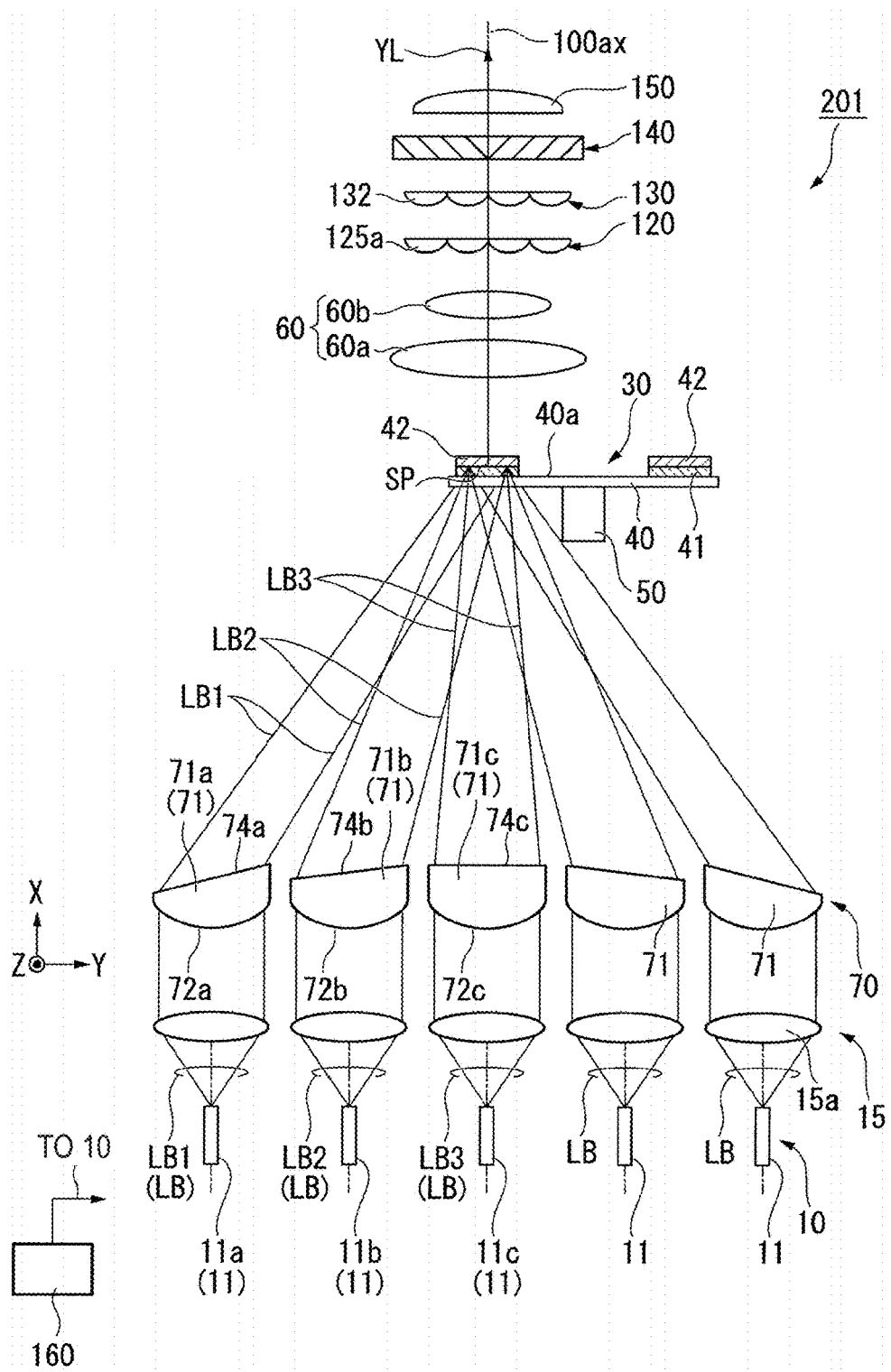
FIG. 4 is a diagram illustrating a schematic configuration of a first illumination device according to a second embodiment.

FIG. 4 is a diagram illustrating a schematic configuration of a first illumination device 201 of the present embodiment. As shown in FIG. 4, the first illumination device 201 includes a first light source device 10, a collimating optical system 15, a light shaping optical system 70, a rotary fluorescent plate 30, a pickup optical system 60, a first lens array 120, a second lens array 130, a polarization conversion element 140, a superposition lens 150, and a control device 160.

The collimating optical system 15 includes a plurality of collimating lenses 15a. The plurality of collimating lenses 15a are arranged two-dimensionally. Each of the plurality of collimating lenses 15a is disposed corresponding to one of the plurality of semiconductor lasers 11. That is, the plurality of collimating lenses 15a are arranged in a matrix (for example, five rows by five columns in FIG. 4). In the present embodiment, the collimating lens 15a corresponds to a "condensing lens" in the appended claims.

Each of the plurality of collimating lenses 15a collimates a corresponding laser beam LB. In the present embodiment, the laser beam LB is incident on the light shaping optical system 70 in a state where the laser beam is converted into collimated light.

The light shaping optical system 70 includes a plurality of lenses 71 arranged in an array. Each of the plurality of lenses 71 is disposed corresponding to one of the plurality of semiconductor lasers 11. That is, the plurality of lenses 71 are arranged in a matrix (for example, five rows by five columns).

In the present embodiment, each of the plurality of lenses 71 is constituted by a free-form surface lens having a free-form surface. Each of the plurality of lenses 71 forms the shape of a spot formed on a region to be illuminated (phosphor layer 42) by a corresponding laser beam LB and makes the illuminance distribution of the spot uniform.

In the present embodiment, the plurality of lenses 71 includes a first lens 71a, a second lens 71b, and a third lens 71c. The first lens 71a corresponds to the first semiconductor laser 11a, the second lens 71b corresponds to the second semiconductor laser 11b, and the third lens 71c corresponds to the third semiconductor laser 11c. Therefore, the laser beam LB1 is incident on the first lens 71a, the laser beam LB2 is incident on the second lens 71b, and the laser beam LB3 is incident on the third lens 71c.

Hereinafter, the structure of the first lens 71a out of the plurality of lenses 71 will be described by way of example. The first lens 71a has a first free-form surface 72a, specified by a polynomial expression in which x and y are used as variables, on the light incident surface side, and has a refractive surface 74a on the light emission surface side. The first free-form surface 72a is rotationally asymmetrical in shape, and is specified by Expression (1).

In the present embodiment, the polynomial expression specifying the first free-form surface 72a satisfies the first condition. Therefore, it is possible to make the spot of the laser beam LB1 rectangular, and to uniformize the illuminance distribution of the spot through conversion into a so-called top hat distribution.

In the present embodiment, the laser beam LB1 which is incident on the first lens 71a is converted from diverging light into collimated light by the collimating optical system 15. Therefore, as compared with the first free-form surface in the first embodiment in which the collimating optical system 15 is not used, a load applied to the first free-form surface 72a is low. Therefore, since the design conditions of the first free-form surface 72a are further alleviated than those in the first embodiment, the design of the first lens 71a is facilitated.

The refractive surface 74a is constituted by a plane surface (for example, prism surface), and deflects the laser beam LB1 emitted from the first lens 71a. Thereby, it is possible to adjust the spot position of the laser beam LB1.

The polynomial expression specifying the first free-form surface 72a satisfies the third condition. Thereby, it is possible to form a spot having no distortion on a region to be illuminated by correcting distortion due to deflection.

Since the first lens 71a has the above-described refractive surface 74a, the first free-form surface 72a is not required to deflect the laser beam LB1. That is, the first free-form surface 72a does not satisfy the second condition. Since the first free-form surface 72a does not have a deflection function of the laser beam LB1, the shape design of a lens is facilitated.

Even in a case where the first lens 71a has the refractive surface 74a, the second condition may be satisfied. According to this, the first free-form surface 72a and the refractive surface 74a are configured to have a refraction force, and thus it is possible to reduce the refraction force of the refractive surface 74a.

Further, in the first lens 71a of the present embodiment, the odd-ordered coefficient of x and the odd-ordered coefficient of y in Expression (1) are 0, and the coefficients of terms obtained by combining x and y are 0. That is, the polynomial expression is constituted by the even-ordered term of x and the even-ordered term of y. Hereinafter, "the polynomial expression is constituted by the even-ordered term of x and the even-ordered term of y" may also be called a fourth condition.

Since it is easy to design the shape of the first free-form surface 72a satisfying the fourth condition, it is possible to reduce a cost.

As described above, according to the first lens 71a, it is possible to forma spot SP having a rectangular and uniform illuminance distribution on the phosphor layer 42. In addition, since the first lens 71a does not need a function of refracting the laser beam LB1, its design is facilitated.

Similarly, the second lens 71b has a second free-form surface 72b and a refractive surface 74b. The second free-form surface 72b satisfies the first, third, and fourth conditions, and is designed so that the laser beam LB2 emitted from the second lens 71b forms the spot SP having a rectangular and uniform illuminance distribution on the phosphor layer 42. The second free-form surface 72b causes the laser beam LB2 emitted from the second lens 71b and the laser beam LB1 emitted from the first lens 71a to superpose each other on the phosphor layer 42.

Similarly, the third lens 71c has a third free-form surface 72c and a refractive surface 74c. The third free-form surface 72c satisfies the first, third, and fourth conditions, and is designed so that the laser beam LB3 emitted from the third lens 71c forms the spot SP having a rectangular and uniform illuminance distribution on the phosphor layer 42. The third free-form surface 72c causes the laser beam LB3 to superpose the laser beam LB1 and the laser beam LB2 on the phosphor layer 42.

In the present embodiment, each of the plurality of lenses 71 except the first lens 71a, the second lens 71b, and the third lens 71c also has a free-form surface satisfying the first, third, and fourth conditions. Therefore, the laser beam LB emitted from each lens 71 forms the spot SP having a rectangular and uniform illuminance distribution on the phosphor layer 42, and the respective spots SP superpose each other on the phosphor layer 42. Thereby, the region SA to be illuminated is formed on the phosphor layer 42 by a plurality of laser beams LB.

In a case where distortion due to deflection is small, the lens 71 having a free-form surface satisfying only the first and fourth conditions may be adopted. In this case, since distortion is not required to be corrected, the design of the lens 71 is facilitated.

Based on such a configuration, the light shaping optical system 70 of the present embodiment can form the spot SP on the phosphor layer 42 in a rectangular shape, and make the illuminance distribution of the spot SP uniform. The collimating optical system 15 can be regarded as a collimating lens array having been hitherto used in order to collimate each laser beam LB. Thus, the number of components can be further reduced than in a case where the illuminance distribution is made uniform using two multi-lenses in addition to the collimating lens array.

According to the first illumination device 201 of the present embodiment, since the illuminance distribution of the region SA to be illuminated which is formed on the phosphor layer 42 is made uniform, it is possible to generate the fluorescent light YL with high efficiency.

A positional relationship between the collimating optical system 15 and the light shaping optical system 70 is not limited to the above. For example, the first light source device 10, the light shaping optical system 70, and the collimating optical system 15 may be disposed in this order toward the light emission direction of the first illumination device 201.

In addition, a cylindrical lens may be used instead of the collimating optical system 15. Generally, the radiation angle of the laser beam LB has aeolotropy. Therefore, for example, a pair of cylindrical lenses are prepared which have generating lines, respectively, corresponding to a direction having a small radiation angle and a direction having a large radiation angle. Thereby, the laser beam LB having aeolotropy in its radiation angle is satisfactorily collimated, and thus can be caused to be incident on the light shaping optical system 70.

Third Embodiment

Subsequently, a projector according to a third embodiment will be described. The present embodiment has a different configuration of a second illumination device. Hereinafter, the configuration of the second illumination device will be mainly described. Common members and components with respect to those in the first embodiment are denoted by the same reference numerals and signs, and thus the detailed description thereof will not be given.

Figure 5:
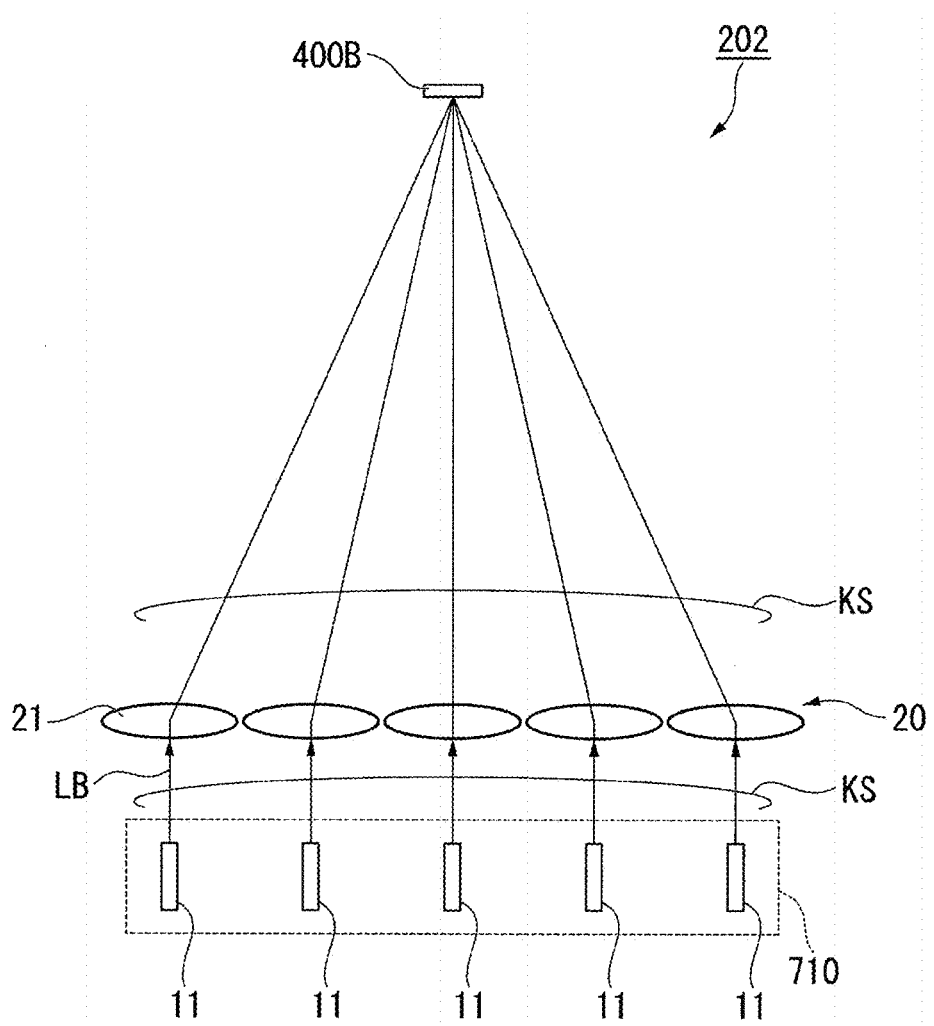
FIG. 5 is a schematic diagram illustrating an optical system of a projector according to a third embodiment.

FIG. 5 is a schematic diagram illustrating a second illumination device of the projector according to the present embodiment. As shown in FIG. 5, a second illumination device 202 of the present embodiment includes a second light source device 710 and a light shaping optical system 20. The second light source device 710 has the same configuration as that of the first light source device 10 of the first illumination device 101, and includes a plurality of semiconductor lasers 11. In the present embodiment, the second light source device 710 emits blue light B constituted by a plurality of laser beams LB toward the light shaping optical system 20.

Similarly to the first illumination device 101, the second illumination device 202 causes each laser beam LB constituting the blue light B to be incident on the liquid crystal light modulating device 400B so that an illuminance distribution on the liquid crystal light modulating device 400B which is a region to be illuminated is made uniform by the light shaping optical system 20.

According to the second illumination device 202 of the present embodiment, it is possible to uniformize the illuminance distribution of the blue light B which is incident on the liquid crystal light modulating device 400B which is a region to be illuminated, with a small number of components, as compared with the lens integrator optical system 740 in which two multi-lens arrays are used.

Fourth Embodiment

Subsequently, a first illumination device according to a fourth embodiment will be described. The present embodiment is different from the second embodiment in the configuration of a light shaping optical system. Hereinafter, the configuration of the light shaping optical system will be mainly described. Common members and components with respect to those in the second embodiment are denoted by the same reference numerals and signs, and thus the detailed description thereof will not be given.

Figure 6:
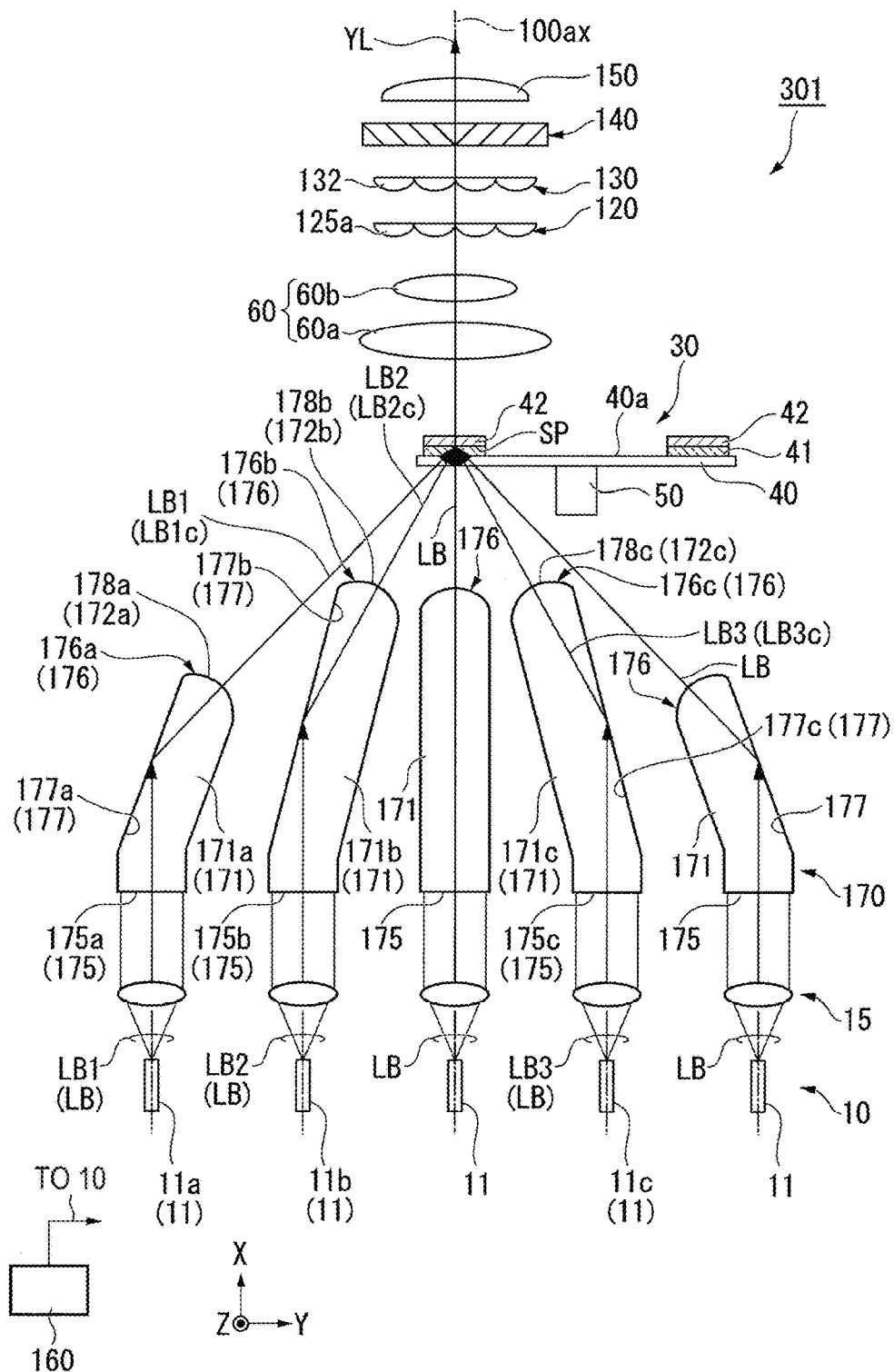
FIG. 6 is a schematic diagram illustrating a first illumination device according to a fourth embodiment.

FIG. 6 is a diagram illustrating a schematic configuration of a first illumination device 301 of the present embodiment. As shown in FIG. 6, the first illumination device 301 includes a first light source device 10, a collimating optical system 15, a light shaping optical system 170, a rotary fluorescent plate 30, a pickup optical system 60, a first lens array 120, a second lens array 130, a polarization conversion element 140, a superposition lens 150, and a control device 160.

The light shaping optical system 170 includes a plurality of optical members 171 arranged in an array. Each of the plurality of optical members 171 is disposed corresponding to one of the plurality of semiconductor lasers 11. That is, the plurality of optical members 171 are arranged in a matrix (for example, five rows by five columns).

In the present embodiment, each of the plurality of optical members 171 is constituted of glass having a light incident surface 175, a light emission surface 176, and a reflection surface 177 formed integrally with each other. The light emission surface 176 is constituted by a lens surface having a free-form surface. Each of the plurality of optical members 171 forms the shape of a spot formed on a region to be illuminated (phosphor layer 42) by a corresponding laser beam LB and makes the illuminance distribution of the spot uniform.

In the present embodiment, the plurality of optical members 171 includes a first optical member 171a, a second optical member 171b, and a third optical member 171c. The first optical member 171a corresponds to the first semiconductor laser 11a, the second optical member 171b corresponds to the second semiconductor laser 11b, and the third optical member 171c corresponds to the third semiconductor laser 11c. Therefore, the laser beam LB1 is incident on the first optical member 171a, the laser beam LB2 is incident on the second optical member 171b, and the laser beam LB3 is incident on the third optical member 171c.

Hereinafter, the structure of the first optical member 171a out of the plurality of optical members 171 will be described by way of example. The first optical member 171a has a light incident surface 175a, a light emission surface 176a, and a reflection surface 177a. FIG. 6 shows only principal rays of light of the laser beams LB which are incident on the respective optical member 171, in order to make the drawing easier to understand.

The light incident surface 175a is constituted by a plane surface (for example, prism surface). A principal ray of light LB1c of the laser beam LB1 is incident on the light incident surface 175a in a surface normal direction. Therefore, when transmitted through the light incident surface 175a, the principal ray of light LB1c of the laser beam LB1 does not have its direction of travel changed due to refraction.

The laser beam LB1 incident on the first optical member 171a through the light incident surface 175a is incident on the reflection surface 177a. The reflection surface 177a is formed of, for example, a metal evaporated film. The reflection surface 177a has no particular limitation on its configuration, and may be constituted by, for example, a total reflection surface (including a total internal reflection surface) for totally reflecting the laser beam LB1. The reflection surface 177a reflects the laser beam LB1 transmitted through the light incident surface 175a to deflect the direction of travel of the laser beam LB1. Thereby, the spot position of the laser beam LB1 on a region to be illuminated is adjusted.

The laser beam LB1 reflected from the reflection surface 177a is incident on the light emission surface 176a. The light emission surface 176a is constituted by a first lens surface 178a. The first lens surface 178a has a first free-form surface 172a specified by a polynomial expression in which x and y are used as variables. The first free-form surface 172a is rotationally asymmetrical in shape, and is specified by Expression (1).

In the present embodiment, the polynomial expression specifying the first free-form surface 172a satisfies the first condition. Therefore, it is possible to make the spot of the laser beam LB1 rectangular, and to uniformize the illuminance distribution of the spot through conversion into a so-called top hat distribution.

In the present embodiment, the laser beam LB1 which is incident on the first free-form surface 172a is converted from diverging light into collimated light by the collimating optical system 15. Therefore, as compared with the first free-form surface in the first embodiment in which the collimating optical system 15 is not used, a load applied to the first free-form surface 172a is low, and the design conditions of the first free-form surface 172a are alleviated.

In the present embodiment, it is preferable that the polynomial expression specifying the first free-form surface 172a satisfies the third condition. Thereby, it is possible to form a spot having no distortion on a region to be illuminated by correcting distortion having occurred due to deflection caused by the reflection surface 177a.

Here, in a case where the refraction of the lens surface is used as a measure for deflecting the direction of travel of the laser beam, there is a concern of a refractive index fluctuating due to a change in the temperature of a lens glass material. In a case where the refractive index of the lens glass material fluctuates, a variation occurs in the direction of travel of light due to the refraction of the lens surface. For this reason, a shift occurs in a spot forming position on a region to be illuminated, and thus there is a concern of the region to be illuminated not being able to be efficiently illuminated.

On the other hand, since the first optical member 171a of the present embodiment has the above-described reflection surface 177a, it is not necessary to deflect (refract) the laser beam LB1 on the first free-form surface 172a. That is, the first free-form surface 172a does not have a refraction function (deflection function) of refracting the laser beam LB1. That is, the first free-form surface 172a does not need to satisfy the above-described second condition.

Therefore, according to the first optical member 171a of the present embodiment, light is deflected using reflection caused by the reflection surface 177a instead of refraction caused by the lens surface. Further, the laser beam LB1 is not refracted even when the laser beam is incident from the light incident surface 175a. Therefore, even in a case where the fluctuation of a refractive index due to a temperature change occurs, since the refraction of light is not used as described above, a variation is not likely to occur in the direction of travel of the laser beam LB1. Thus, since a shift is not likely to occur in a spot forming position on a region to be illuminated, it is possible to efficiently form a spot SP having a rectangular and uniform illuminance distribution on the phosphor layer 42.

Similarly, the second optical member 171b has a light incident surface 175b, a light emission surface 176b, and a reflection surface 177b. The light incident surface 175b is constituted by a second lens surface 178b. The second lens surface 178b has a second free-form surface 172b. The second free-form surface 172b satisfies the first and third conditions, and is designed so that the laser beam LB2 emitted from the second optical member 171b forms the spot SP having a rectangular and uniform illuminance distribution on the phosphor layer 42. The second free-form surface 172b causes the laser beam LB2 emitted from the second optical member 171b and the laser beam LB1 emitted from the first optical member 171a to superpose each other on the phosphor layer 42. Since the refraction of light is not used in the second optical member 171b, a variation is not likely to occur in the direction of travel of the laser beam LB2. Thus, it is possible to efficiently form the spot SP having a rectangular and uniform illuminance distribution on the phosphor layer 42.

Similarly, the third optical member 171c has a light incident surface 175c, a light emission surface 176c, and a reflection surface 177c. The light incident surface 175c is constituted by a third lens surface 178c. The third lens surface 178c has a third free-form surface 172c. The third free-form surface 172c satisfies the first and third conditions, and is designed so that the laser beam LB3 emitted from the third optical member 171c forms the spot SP having a rectangular and uniform illuminance distribution on the phosphor layer 42. The third free-form surface 172c causes the laser beam LB3 to superpose the laser beam LB1 and the laser beam LB2 on the phosphor layer 42. Since the refraction of light is not used in the third optical member 171c, a variation is not likely to occur in the direction of travel of the laser beam LB3. Thus, it is possible to efficiently form the spot SP having a rectangular and uniform illuminance distribution on the phosphor layer 42.

In the present embodiment, each of the plurality of optical members 171 except the first optical member 171a, the second optical member 171b, and the third optical member 171c also has a free-form surface satisfying the first and third conditions. Therefore, the laser beams LB emitted from the respective optical members 171 form spots SP having a rectangular and uniform illuminance distribution on the phosphor layer 42, and the respective spots SP superpose each other on the phosphor layer 42. Thereby, the region SA to be illuminated is formed on the phosphor layer 42 by a plurality of laser beams LB. The optical member 171 (for example, optical member 171 located on the illumination optical axis 100ax) that does not deflect the direction of travel of the laser beam LB has only the light incident surface 175 and only the light emission surface 176, and does not have the reflection surface 177.

In each of the plurality of optical members 171, refraction is not also used when light is deflected. Therefore, even in a case where the refractive index of a glass material fluctuates, a variation is not likely to occur in the direction of travel of the laser beam LB. Therefore, according to the light shaping optical system 170 of the present embodiment, the region SA to be illuminated having a rectangular and uniform illuminance distribution can be formed on the phosphor layer 42 with a good degree of accuracy.

According to the first illumination device 301 of the present embodiment, since the uniform region SA to be illuminated can be formed on the phosphor layer 42, it is possible to generate the fluorescent light YL with high efficiency.

In the present embodiment, a case where the optical member 171 has the light incident surface 175, the light emission surface 176, and the reflection surface 177 formed integrally with each other has been given as an example, but the respective surfaces may be formed separately from each other.

For example, an optical member may be formed using a free-form surface lens having the light emission surface 176 and a holding member that holds the free-form surface lens and the reflection surface 177. In this case, it is possible to reduce the number of components by forming the reflection surface 177 on a portion of the holding member. The light incident surface 175 constituted by a flat plate can be omitted.

In addition, portions of the optical member 171 other than the light incident surface 175 and the reflection surface 177 which have an influence on the laser beam LB may be constituted by an air layer. That is, a midway portion of the optical path of the laser beam LB passing through the optical member 171 may be formed to have a hollow structure.

As a portion in which the hollow structure can be adopted, for example, a portion of the optical path of the laser beam LB can be exemplified which is equivalent to a path until the laser beam is transmitted through the light incident surface 175 and then reaches the reflection surface 177, or a path until the laser beam is reflected from the reflection surface 177 and then is incident on the light emission surface 176.

Fifth Embodiment

Subsequently, a first illumination device according to a fifth embodiment will be described. The present embodiment is different from the fourth embodiment in the configuration of a light shaping optical system. Hereinafter, the configuration of the light shaping optical system will be mainly described. Common members and components with respect to those in the fourth embodiment are denoted by the same reference numerals and signs, and thus the detailed description thereof will not be given.

Figure 7:
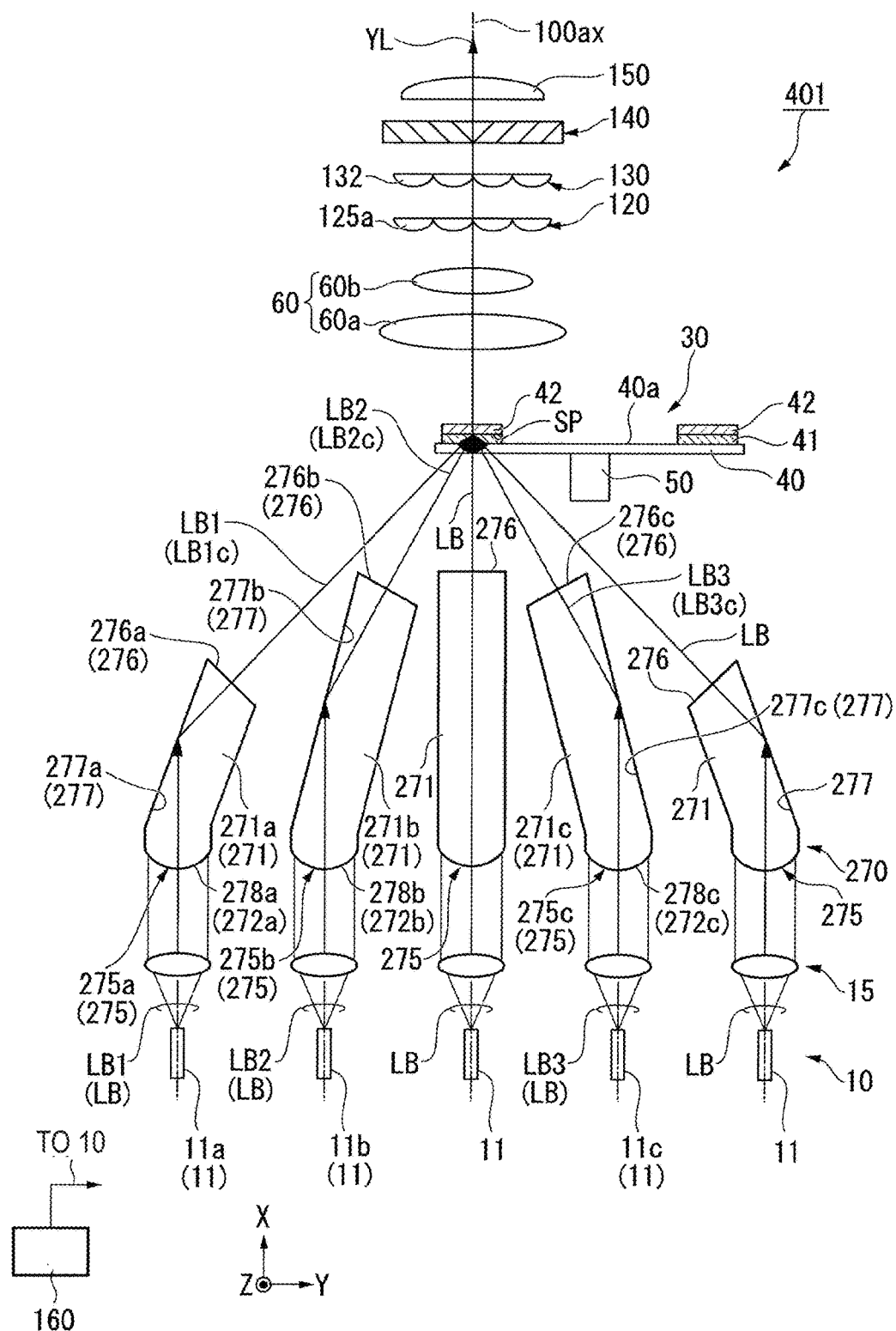
FIG. 7 is a schematic diagram illustrating a first illumination device according to a fifth embodiment.

FIG. 7 is a diagram illustrating a schematic configuration of a first illumination device 401 of the present embodiment. As shown in FIG. 7, the first illumination device 401 includes a first light source device 10, a collimating optical system 15, a light shaping optical system 270, a rotary fluorescent plate 30, a pickup optical system 60, a first lens array 120, a second lens array 130, a polarization conversion element 140, a superposition lens 150, and a control device 160.

The light shaping optical system 270 includes a plurality of optical members 271 arranged in an array. Each of the plurality of optical members 271 is disposed corresponding to each of the plurality of semiconductor lasers 11. That is, the plurality of optical members 171 are arranged in a matrix (for example, five rows by five columns).

In the present embodiment, each of the plurality of optical members 271 has a light incident surface 275, a light emission surface 276, and a reflection surface 277. The light incident surface 275 is constituted by a lens surface having a free-form surface. Each of the plurality of optical members 271 forms the shape of a spot formed on a region to be illuminated (phosphor layer 42) by a corresponding laser beam LB and makes the illuminance distribution of the spot uniform.

In the present embodiment, the plurality of optical members 271 includes a first optical member 271a, a second optical member 271b, and a third optical member 271c. The first optical member 271a corresponds to the first semiconductor laser 11a, the second optical member 271b corresponds to the second semiconductor laser 11b, and the third optical member 271c corresponds to the third semiconductor laser 11c. Therefore, the laser beam LB1 is incident on the first optical member 271a, the laser beam LB2 is incident on the second optical member 271b, and the laser beam LB3 is incident on the third optical member 271c.

Hereinafter, the structure of the first optical member 271a out of the plurality of optical members 271 will be described by way of example. The first optical member 271a has a light incident surface 275a, a light emission surface 276a, and a reflection surface 277a. FIG. 7 shows only principal rays of light of the laser beams LB which are incident on the respective optical members 271, in order to make the drawing easier to understand.

The light incident surface 275a is constituted by a first lens surface 278a. The first lens surface 278a has a first free-form surface 272a specified by a polynomial expression in which x and y are used as variables. The first free-form surface 272a is rotationally asymmetrical in shape, and is specified by Expression (1).

In the present embodiment, the polynomial expression specifying the first free-form surface 272a satisfies the first condition. Therefore, it is possible to make the spot of the laser beam LB1 rectangular, and to uniformize the illuminance distribution of the spot through conversion into a so-called top hat distribution.

In the present embodiment, the laser beam LB1 which is incident on the first free-form surface 272a is converted from diverging light into collimated light by the collimating optical system 15. Therefore, as compared with the first free-form surface in the first embodiment in which the collimating optical system 15 is not used, a load applied to the first free-form surface 272a is low, and the design conditions of the first free-form surface 272a are alleviated.

The reflection surface 277a is formed of, for example, a metal evaporated film, and reflects the laser beam LB1 transmitted through the light incident surface 275a to deflect the direction of travel of the laser beam LB1. Thereby, the spot position of the laser beam LB1 on a region to be illuminated is adjusted.

The light emission surface 276a is constituted by a plane surface (for example, prism surface). The principal ray of light LB1c of the laser beam LB1 is incident on the light emission surface 276a in a surface normal direction. Therefore, when emitted from the light emission surface 276a, the principal ray of light LB1c of the laser beam LB1 does not have its direction of travel changed due to refraction.

In the present embodiment, it is preferable that the polynomial expression specifying the first free-form surface 272a satisfies the third condition. Thereby, it is possible to form a spot having no distortion on a region to be illuminated by correcting distortion having occurred due to deflection caused by the reflection surface 277a.

In the first optical member 271a of the present embodiment, light is deflected using reflection caused by the reflection surface 277a instead of refraction caused by the lens surface, and the laser beam LB1 is not refracted when the laser beam is emitted from the light emission surface 276a. Therefore, even in a case where a fluctuation occurs in the refractive index of a glass material due to a temperature change, a variation is not likely to occur in the direction of travel of the laser beam LB1. Thus, since a shift is not likely to occur in a spot forming position on a region to be illuminated, it is possible to efficiently form a spot SP having a rectangular and uniform illuminance distribution on the phosphor layer 42.

Similarly, the second optical member 271b has a light incident surface 275b, a light emission surface 276b, and a reflection surface 277b. The light incident surface 275b is constituted by a second lens surface 278b. The second lens surface 278b has a second free-form surface 272b. The second lens surface 278b satisfies the first and third conditions, and is designed so that the laser beam LB2 emitted from the second optical member 271b forms a spot SP having a rectangular and uniform illuminance distribution on the phosphor layer 42. Since the refraction of light is not used in the second optical member 271b, a variation is not likely to occur in the direction of travel of the laser beam LB2, and thus it is possible to efficiently form the spot SP having a rectangular and uniform illuminance distribution on the phosphor layer 42.

Similarly, the third optical member 271c has a light incident surface 275c, a light emission surface 276c, and a reflection surface 277c. The light incident surface 275c is constituted by a third lens surface 278c. The third lens surface 278c has a third free-form surface 272c. The third free-form surface 272c satisfies the first and third conditions, and is designed so that the laser beam LB3 emitted from the third optical member 271c forms a spot SP having a rectangular and uniform illuminance distribution on the phosphor layer 42. Since the refraction of light is not used in the third free-form surface 272c, a variation is not likely to occur in the direction of travel of the laser beam LB3, and thus it is possible to efficiently form the spot SP having a rectangular and uniform illuminance distribution on the phosphor layer 42.

In the present embodiment, each of the plurality of optical members 271 except the first optical member 271a, the second optical member 271b, and the third optical member 271c also has a free-form surface satisfying the first and third conditions. In each of the plurality of optical members 271, refraction is not also used when light is deflected. Therefore, even in a case where the refractive index of a glass material fluctuates, a variation is not likely to occur in the direction of travel of the laser beam LB. Therefore, according to the light shaping optical system 270 of the present embodiment, the region SA to be illuminated having a rectangular and uniform illuminance distribution can be formed on the phosphor layer 42 with a good degree of accuracy. The optical member 271 (for example, optical member 271 located on the illumination optical axis 100ax) that does not deflect the direction of travel of the laser beam LB has only the light incident surface 275 and only the light emission surface 276, and does not have the reflection surface 277.

According to the first illumination device 401 of the present embodiment, since the uniform region SA to be illuminated can be formed on the phosphor layer 42, it is possible to generate the fluorescent light YL with high efficiency.

Sixth Embodiment

Subsequently, a first illumination device according to a sixth embodiment will be described. The present embodiment is different from the fifth embodiment in the configuration of a light shaping optical system. Hereinafter, the configuration of the light shaping optical system will be mainly described. Common members and components with respect to those in the fourth embodiment are denoted by the same reference numerals and signs, and thus the detailed description thereof will not be given.

Figure 8:
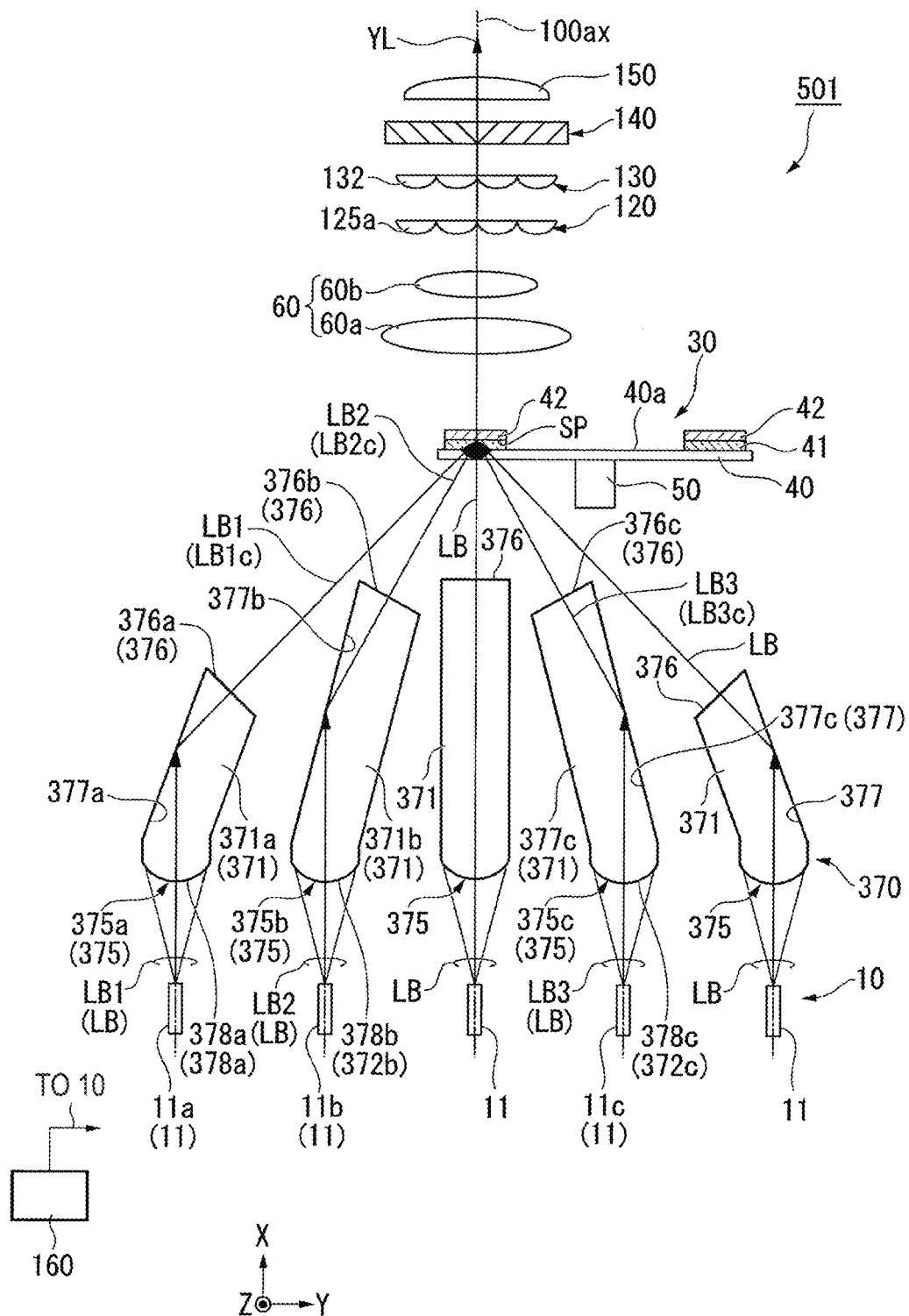
FIG. 8 is a schematic diagram illustrating a first illumination device according to a sixth embodiment.

FIG. 8 is a diagram illustrating a schematic configuration of a first illumination device 501 of the present embodiment. As shown in FIG. 8, the first illumination device 501 includes a first light source device 10, a light shaping optical system 370, a rotary fluorescent plate 30, a pickup optical system 60, a first lens array 120, a second lens array 130, a polarization conversion element 140, a superposition lens 150, and a control device 160.

The light shaping optical system 370 includes a plurality of optical members 371 arranged in an array. Each of the plurality of optical members 371 is disposed corresponding to one of the plurality of semiconductor lasers 11. That is, the plurality of optical members 171 are arranged in a matrix (for example, five rows by five columns).

In the present embodiment, each of the plurality of optical members 371 has a light incident surface 375, a light emission surface 376, and a reflection surface 377. The light incident surface 375 is constituted by a lens surface having a free-form surface. FIG. 8 shows only principal rays of light of the laser beams LB which are incident on the respective optical members 371, in order to make the drawing easier to understand.

The light incident surface 375 is constituted by a lens surface having a free-form surface specified by the polynomial expression of Expression (1) in which x and y are used as variables. In the present embodiment, the light incident surface 375 is designed to have a function as a collimating lens that collimates a laser beam LB emitted from a corresponding semiconductor laser 11. Therefore, the first illumination device 501 of the present embodiment is configured such that a function of the collimating optical system 15 in the first illumination device 401 of the fifth embodiment is shared by the light shaping optical system 370.

According to the first illumination device 501 of the present embodiment, since the collimating optical system can be omitted, it is possible to reduce the size of the configuration of the device.

In each of the embodiments, a case where each of the plurality of laser beams LB irradiates the entire surface of the region to be illuminated and superposed illumination with the respective laser beams LB is performed has been given as an example, but the invention is not limited thereto.

First Modification Example

A light shaping optical system 20 of the present modification example is configured to cause the respective spots SP to be incident on different regions of the region SA to be illuminated, respectively. That is, in the present modification example, the respective spots SP do not superpose each other unlike the above embodiments.

For example, the first lens 21a and the second lens 21b are configured such that the free-form surfaces 22a and 22b are designed so as to cause the position of a spot at which the laser beam LB1 is formed on the region SA to be illuminated and the position of a spot at which the laser beam LB2 is formed on the region SA to be illuminated to be different from each other.

Figure 9:
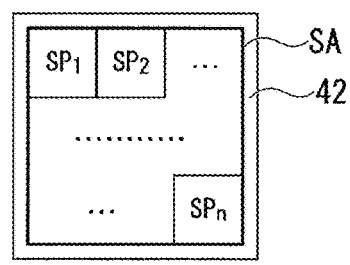
FIG. 9 is a diagram conceptually illustrating an illumination mode of a region to be illuminated according to a first modification example.

FIG. 9 is a diagram conceptually illustrating a modification example of an illumination mode of a region to be illuminated. In FIG. 9, the number of spots SP formed on the phosphor layer 42 by the laser beam LB is set to n. In FIG. 9, n spots SP are shown by $SP_1$, $SP_2$, . . . $SP_n$, respectively.

Each of the spots SP is rectangular in shape, and has a uniform illuminance distribution. Therefore, the region SA to be illuminated which is constituted by n spots SP has a uniform illuminance distribution as a whole.

In addition, according to the present modification example, since the respective spots are not caused to superpose each other, it is possible to illuminate the region SA to be illuminated having any size by appropriately adjusting the sizes of the respective spots.

In addition, according to the present modification example, the positions of the respective spots SP are different from each other in the region SA to be illuminated. Thus, in a case where the region SA to be illuminated is the phosphor layer 42, the intensity of irradiation light per unit area becomes smaller than in a case where the respective spots SP are caused to superpose each other as in the first embodiment. Thereby, since the light intensity of the phosphor layer 42 per unit area is reduced, it is possible to generate the fluorescent light YL with higher efficiency.

In the present modification example, the outputs of the respective laser beams LB can also be independently controlled by the control device 160. In a case where the region SA to be illuminated is set to a light modulating device such as a liquid crystal light modulating device, the illuminance distribution of the region SA to be illuminated which is formed in a light modulating device is adjusted in accordance with an image to be displayed, and thus it is possible to improve the quality of the image.

Second Modification Example

Figure 10:
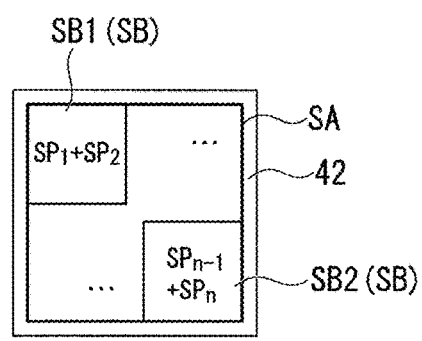
FIG. 10 is a diagram conceptually illustrating an illumination mode of the region to be illuminated according to a second modification example.

FIG. 10 is a diagram conceptually illustrating a modification example of the illumination mode of the region to be illuminated. In FIG. 10, the number of spots SP formed on the phosphor layer 42 by laser beams is set to n. In FIG. 10, n spots SP are shown by $SP_1$, $SP_2$, . . . $SP_n$, respectively.

In the present modification example, the spots SP are caused to partially superpose each other in the region SA to be illuminated. As shown in FIG. 7, the region SA to be illuminated is constituted by a plurality of illumination regions SB including a first illumination region SB1 and a second illumination region SB2. At least one illumination region SB out of the plurality of illumination regions SB is formed by two spots SP superposing each other. Other illumination regions SB may be formed by one spot SP.

In the present modification example, the first illumination region SB1 is formed by, for example, a spot $SP_1$ and a spot $SP_2$ superposing each other. In addition, the second illumination region SB2 is formed by two other laser beams (spot $SP_{n-1}$ and spot $SP_n$) superposing each other.

In the present modification example, since each of the spots SP has a uniform illuminance distribution, each of the illumination regions SB is assumed to have a uniform illuminance distribution. Thus, the region SA to be illuminated which is constituted by the plurality of illumination regions SB has a uniform illuminance distribution, and the same effect as that in the first modification example is exhibited.

Third Modification Example

Figure 11:
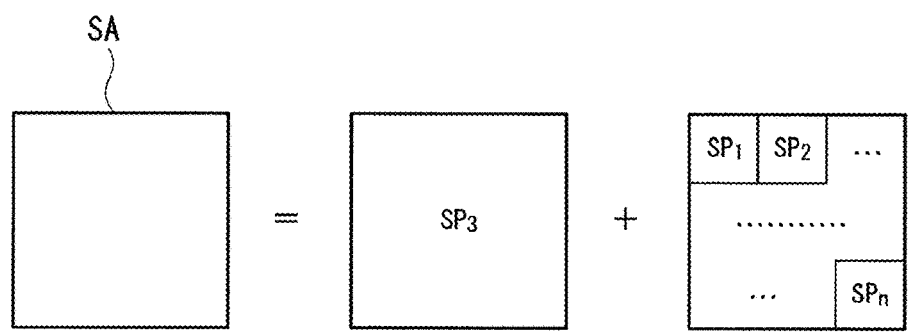
FIG. 11 is a diagram conceptually illustrating an illumination mode of the region to be illuminated according to a third modification example.

FIG. 11 is a diagram conceptually illustrating a modification example of the illumination mode of the region to be illuminated. In FIG. 11, the number of spots SP formed on the phosphor layer 42 by laser beams is set to n. In FIG. 11, n spots SP are shown by $SP_1$, $SP_2$, . . . $SP_n$, respectively.

In the light shaping optical system 20 according to the present modification example, the third lens 21c (third free-form surface 22c) causes the laser beam LB3 to be incident on the entire surface of the region SA to be illuminated. In addition, the first lens 21a (first free-form surface 22a) causes the laser beam LB1 to be incident on a region of a portion of the region SA to be illuminated. In addition, the second lens 21b (second free-form surface 22b) causes the laser beam LB2 to be incident on a region (separate region from the incident region of the laser beam LB1) of a portion of the region SA to be illuminated.

In the present modification example, the control device 160 controls the output of the first semiconductor laser 11a and the output of the second semiconductor laser 11b independently of each other. That is, the control device 160 controls the output of each semiconductor laser 11 to set each spot SP to a desired illuminance distribution.

As shown in FIG. 11, the light shaping optical system 20 of the present embodiment is configured such that one spot $SP_3$ irradiates the entire surface of the region SA to be illuminated, and that the remaining (n−1) spots SP except the spot $SP_3$ are incident on different regions of the region SA to be illuminated, respectively.

In the present modification example, since each of the spots SP also has a uniform illuminance distribution, the same effect as that in the first modification example is obtained.

The invention is not limited to the contents of the embodiments and the modification examples described above, and can be appropriately modified and changed without departing from the scope of the invention.

For example, in the above embodiments, a case where the first light source device 10 is constituted by the plurality of semiconductor lasers 11 has been given as an example, but the invention is not limited thereto. For example, the first light source device 10 may be constituted by only one semiconductor laser 11 (for example, first semiconductor laser 11a). In this case, the light shaping optical system 20 includes only the first lens 21a.

In the above embodiment, the term superposition has been described as a state where substantially whole spots SP of the respective laser beams LB overlap each other, but the superposition in the invention also includes a state where some of the respective spots SP overlap each other.

That is, it is assumed that the first light source device 10 is constituted by at least two semiconductor lasers 11 (for example, first semiconductor laser 11a and second semiconductor laser 11b), and that the incident positions of the laser beams LB1 and B2 emitted from the first semiconductor laser 11a and the second semiconductor laser 11b slightly shift from each other due to a mounting error. In this case, a region (superposed region) partially overlapped in the spots SP formed by the laser beams LB1 and B2 constitutes a region to be illuminated.

In addition, in the above embodiment, the projector 1 including three liquid crystal light modulating devices 400R, 400G, and 400B has been illustrated as a light modulating device, but the invention can also be applied to a projector that displays a color image using one liquid crystal light modulating device. In addition, a digital mirror device may be used as the light modulating device.

In the above embodiment, an example has been illustrated in which the illumination device according to the invention is mounted in the projector, but there is no limitation thereto. The illumination device according to the invention can also be applied to illumination appliances, headlights of an automobile, or the like.

EXAMPLES

The inventor has performed simulations on lenses constituting the light shaping optical system. In the present simulations, the coefficients of the polynomial expression of Expression (1) specifying the free-form surface of a lens are set to parameters, and an illuminance distribution in a region to be illuminated in a case where each free-form surface is used has been obtained.

Example 1

Example 1 is the simulation results of a lens having a free-form surface satisfying the first condition (the coefficient $C_i$ of the $x^{2h}$ term is different from the coefficient $C_j$ of the $y^{2h}$ term), the second condition (at least one of the first-order term of x and the first-order term of y is included), and the third condition (at least one $x^p y^q$ term is included). That is, the lens of Example 1 is equivalent to the lens 21 constituting the light shaping optical system 20 of the first embodiment satisfying the first condition to the third condition.

Table 1 shows respective parameters of Example 1.

TABLE 1

| Parameter name | Example 1 |
| --- | --- |
| X | −0.35 |
| Y | −0.35 |
| $X^2$ | −0.02 |
| XY | 0.008 |
| $Y^2$ | 0.02 |
| $X^4$ | −0.002 |
| $X^3Y$ | 0 |
| $Y^4$ | −0.08 |
| Curvature | 0.029 |
| Conic constant | 0 |

In Example 1, in Expression (1), the coefficients of the x and y terms are set to −0.35, the coefficient of the $x^2$ term is set to −0.02, the coefficient of the xy term is set to 0.008, the coefficient of the $y^2$ term is set to 0.02, the coefficient of the $x^4$ term is set to −0.002, the coefficient of the $x^3y$ term is set to 0, the coefficient of the $y^4$ term is set to −0.08, a curvature c is set to 0.029, and a conic constant k is set to 0. The coefficients of terms which are not written in Table 1 are all 0.

Figure 12A:
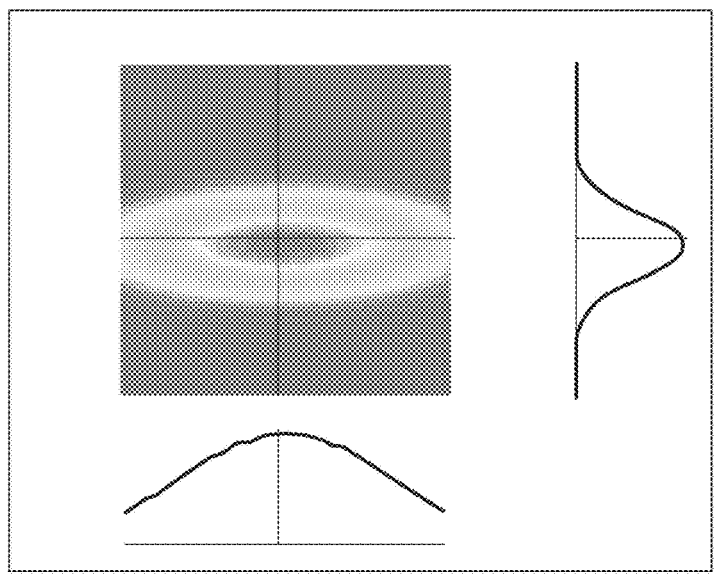
FIG. 12A is a diagram illustrating an illuminance distribution in a case where a spherical lens is used in Example 1.
Figure 12B:
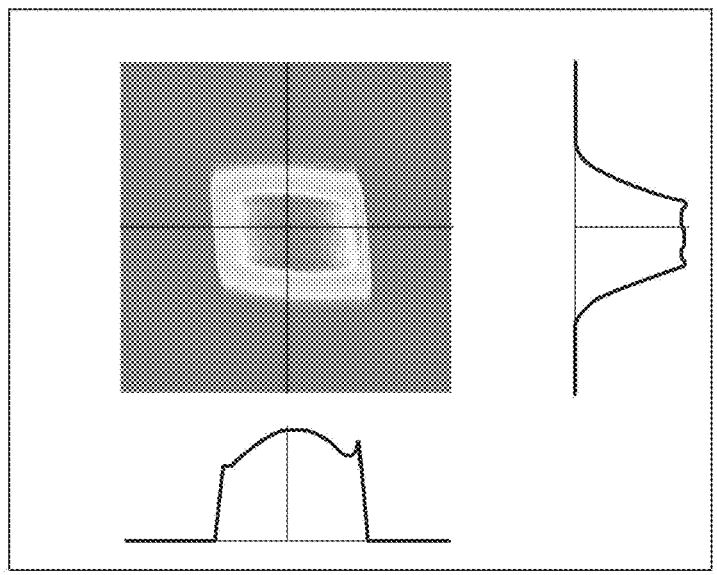
FIG. 12B is a diagram illustrating an illuminance distribution in a case where a free-form surface lens of Example 1 is used.

FIGS. 12A and 12B are diagrams illustrating the simulation results of Example 1. FIG. 12A is a diagram illustrating an illuminance distribution in a case where a spherical lens is used, as a comparison example, and FIG. 12B is a diagram illustrating an illuminance distribution in a case where a free-form surface lens having the above parameters (first condition to third condition) is used. In FIGS. 12A and 12B, graphs shown on the lower side are the illuminance distribution of a region to be illuminated in a horizontal direction, and graphs shown on the right side are the illuminance distribution of the region to be illuminated in a vertical direction.

As shown in FIG. 12A, in a case where a spherical lens is used, the laser beam forms an elliptical spot in the region to be illuminated, and the illuminance distribution of the spot becomes non-uniform.

On the other hand, as shown in FIG. 12B, in a case where the free-form surface lens of Example 1 is used, the laser beam forms an approximately rectangular spot in the region to be illuminated, and the uniformity of the illuminance distribution of the spot improves. That is, from Example 1, the free-form surface lens satisfying the first condition and the second condition is adopted, it has been confirmed that it is possible to form the region to be illuminated in a rectangular shape, and to make the illuminance distribution uniform.

Example 2

Similarly to Example 1, Example 2 is the simulation results of a lens having a free-form surface satisfying the first condition to the third condition.

Table 2 shows respective parameters of Example 2.

TABLE 2

| Parameter name | Example 2 |
| --- | --- |
| X | −0.25 |
| Y | −0.75 |
| $X^2$ | −0.01 |
| XY | 0.006 |
| $Y^2$ | −0.012 |
| $X^4$ | −0.001 |

TABLE 2-continued

| Parameter name | Example 2 |
|---|---|
| $X^3Y$ | 0.001 |
| $Y^4$ | 0.02 |
| Curvature | 0.01 |
| Conic constant | 0 |

In Example 2, in Expression (1), the coefficient of the x term is set to −0.25, the coefficient of the y term is set to −0.75, the coefficient of the $x^2$ term is set to −0.01, the coefficient of the xy term is set to 0.006, the coefficient of the $y^2$ term is set to −0.012, the coefficient of the $x^4$ term is set to −0.001, the coefficient of the $x^3y$ term is set to 0.001, the coefficient of the $y^4$ term is set to 0.02, a curvature c is set to 0.01, and a conic constant k is set to 0. The coefficients of terms which are not written in Table 2 are all 0.

Figure 13A:
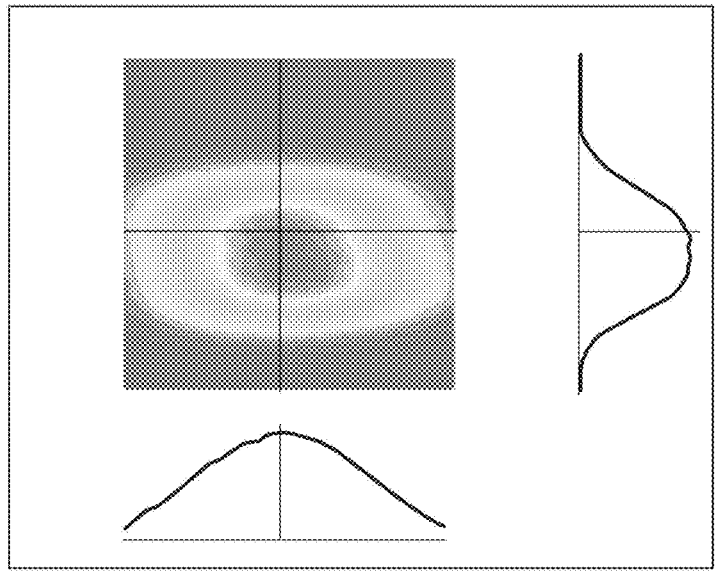
FIG. 13A is a diagram illustrating an illuminance distribution in a case where a spherical lens is used in Example 2.
Figure 13B:
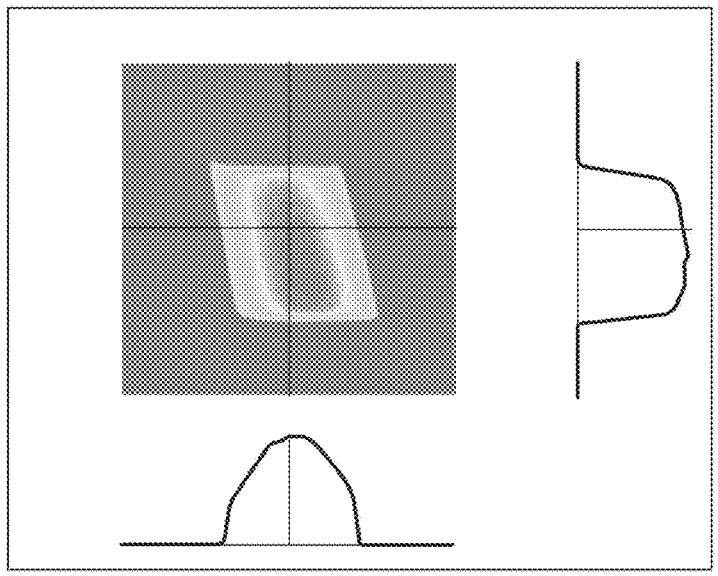
FIG. 13B is a diagram illustrating an illuminance distribution in a case where a free-form surface lens of Example 2 is used.

FIGS. 13A and 13B are diagrams illustrating the simulation results of Example 2. FIG. 13B is a diagram illustrating an illuminance distribution in a case where a free-form surface lens having the above parameters is used, and FIG. 13A is a diagram illustrating an illuminance distribution in a case where coefficients except the coefficient of X and the coefficient of Y are all set to 0, as a comparative example. In FIGS. 13A and 13B, graphs shown on the lower side are the illuminance distribution of a region to be illuminated in a horizontal direction, and graphs shown on the right side are the illuminance distribution of the region to be illuminated in a vertical direction.

As shown in FIGS. 13A and 13B, in a case where a free-form surface lens satisfying the first condition and the second condition is used, a rectangular spot having a uniform illuminance distribution is formed in the region to be illuminated. In this manner, from Example 2, the free-form surface lens satisfying the first condition and the second condition is adopted, and thus it has been confirmed that it is possible to form the region to be illuminated in a rectangular shape, and to make the illuminance distribution uniform.

Example 3

Example 3 is the simulation results of a lens having a free-form surface satisfying the first condition and the third condition. That is, the lens of Example 3 is equivalent to the lens 71 constituting the light shaping optical system 70 of the second embodiment satisfying the first condition and the third condition.

Table 3 shows respective parameters of Example 3.

TABLE 3

| Parameter name | Example 3 |
|---|---|
| X | 0 |
| Y | 0 |
| $X^2$ | −0.02 |
| XY | 0.008 |
| $Y^2$ | 0.02 |
| $X^4$ | −0.002 |
| $X^3Y$ | 0 |
| $Y^4$ | −0.08 |
| Curvature | 0.029 |
| Conic constant | 0 |

In Example 3, in Expression (1), the coefficients of the x and y terms are set to 0, the coefficient of the $x^2$ term is set to −0.02, the coefficient of the xy term is set to 0.008, the coefficient of the $y^2$ term is set to 0.02, the coefficient of the $x^4$ term is set to −0.002, the coefficient of the $x^3y$ term is set to 0, the coefficient of the $y^4$ term is set to −0.08, a curvature c is set to 0.029, and a conic constant k is set to 0. The coefficients of terms which are not written in Table 3 are all 0.

Example 3 has the same parameters as those in Example 1, except that the coefficients of the x and y terms are set to 0. That is, the free-form surface of Example 3 and the free-form surface of Example 1 are different from each other only in the presence or absence of a function of deflecting light. The function of deflecting light does not influence the shape of a spot formed on a region to be illuminated and the illuminance distribution of the spot.

In a case where the free-form surface lens of Example 3 is adopted, it is possible to realize the same illuminance distribution as that in FIG. 12B of Example 1. That is, it has been confirmed that it is possible to form the region to be illuminated in a rectangular shape, and to make the illuminance distribution uniform. A diagram illustrating the illuminance distribution relating to Example 3 is the same as that in Example 1, and thus is omitted.

Example 4

Similarly to Example 3, Example 4 is the simulation results of a lens having a free-form surface satisfying the first condition and the third condition.

Table 4 shows respective parameters of Example 4.

TABLE 4

| Parameter name | Example 4 |
|---|---|
| X | 0 |
| Y | 0 |
| $X^2$ | −0.01 |
| XY | 0.006 |
| $Y^2$ | −0.012 |
| $X^4$ | −0.001 |
| $X^3Y$ | 0.001 |
| $Y^4$ | 0.02 |
| Curvature | 0.01 |
| Conic constant | 0 |

In Example 4, in Expression (1), the coefficients of the x and y terms are set to 0, the coefficient of the $x^2$ term is set to −0.01, the coefficient of the xy term is set to 0.006, the coefficient of the $y^2$ term is set to −0.012, the coefficient of the $x^4$ term is set to −0.001, the coefficient of the $x^3y$ term is set to 0.001, the coefficient of the $y^4$ term is set to 0.02, a curvature cis set to 0.01, and a conic constant k is set to 0. The coefficients of the terms which are not written in Table 4 are all 0.

Example 4 has the same parameters as those in Example 2, except that the coefficients of the x and y terms are set to 0. That is, the free-form surface of Example 4 and the free-form surface of Example 2 are different from each other only in the presence or absence of a function of deflecting light.

In a case where the free-form surface lens of Example 4 is adopted, it is possible to realize the same illuminance distribution as that in FIG. 13B of Example 2. That is, it has been confirmed that it is possible to form the region to be illuminated in a rectangular shape, and to make the illuminance distribution uniform. A diagram illustrating the illuminance distribution relating to the Example 4 is the same as that in Example 2, and thus is omitted.

Example 5

Example 5 is the simulation results of a lens having a free-form surface satisfying the first condition and the fourth condition (polynomial expression is constituted by the even-ordered term of x and the even-ordered term of y). That is, the lens of Example 5 is equivalent to the lens 71 constituting the light shaping optical system 70 of the second embodiment satisfying the first condition and the fourth condition.

Table 5 shows respective parameters of Example 5.

TABLE 5

| Parameter name | Example 5 |
|---|---|
| $X^2$ | 0.1 |
| $Y^2$ | −0.02 |
| $X^4$ | −0.13 |
| $X^6$ | 0.01 |
| Curvature | 0.125 |
| Conic constant | 0 |

In Example 5, in Expression (1), the coefficient of the $x^2$ term is set to 0.1, the coefficient of the $y^2$ term is set to −0.02, the coefficient of the $x^4$ term is set to −0.13, the coefficient of the $x^6$ term is set to 0.01, a curvature c is set to 0.125, and a conic constant k is set to 0. The coefficients of terms which are not written in Table 5 are all 0.

Figure 14A:
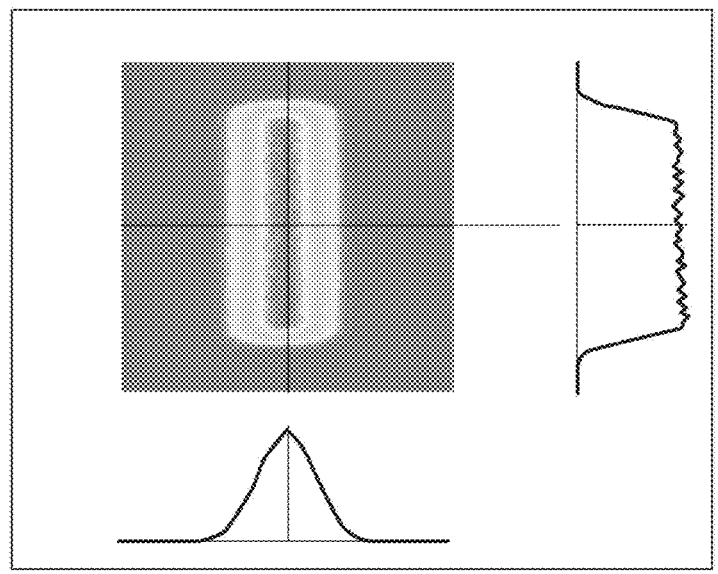
FIG. 14A is a diagram illustrating an illuminance distribution in a case where a spherical lens is used in Example 5.
Figure 14B:
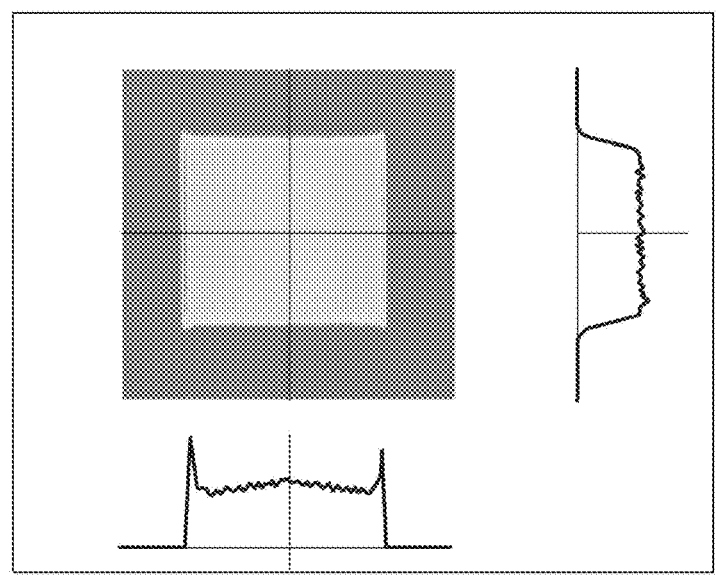
FIG. 14B is a diagram illustrating an illuminance distribution in a case where a free-form surface lens of Example 5 is used.

FIGS. 14A and 14B are diagrams illustrating the simulation results of Example 5. FIG. 14A is a diagram illustrating an illuminance distribution in a case where a spherical lens is used, as a comparison example, and FIG. 14B is a diagram illustrating an illuminance distribution in a case where a free-form surface lens having the above parameters is used. In FIGS. 14A and 14B, graphs shown on the lower side are the illuminance distribution of a region to be illuminated in a horizontal direction, and graphs shown on the right side are the illuminance distribution of the region to be illuminated in a vertical direction.

As shown in FIG. 14A, in the comparative example, the laser beam forms a vertically elongated spot in the region to be illuminated, and the illuminance distribution of the spot becomes non-uniform.

On the other hand, as shown in FIG. 14B, in a case where the free-form surface lens is used of Example 5, the laser beam forms a square spot in the region to be illuminated, and the illuminance distribution of the spot has an improvement in uniformity. That is, from. Example 5, it has been confirmed that, even in a case where the free-form surface lens is adopted which is easy of a shape design by satisfying the first condition and the fourth condition, it is possible to form the region to be illuminated in a square shape, and to make the illuminance distribution uniform.

Example 6

Similarly to Example 5, Example 6 is the simulation results of a lens having a free-form surface satisfying the first condition and the fourth condition.

Table 6 shows respective parameters of Example 6.

TABLE 6

| Parameter name | Example 6 |
|---|---|
| $X^2$ | 0.1 |
| $Y^2$ | −0.02 |
| $X^4$ | −0.11 |
| $X^6$ | 0 |
| Curvature | 0.125 |
| Conic constant | 0 |

In Example 6, in Expression (1), the coefficient of the $x^2$ term is set to 0.1, the coefficient of the $y^2$ term is set to −0.02, the coefficient of the $x^4$ term is set to −0.11, the coefficient of the $x^6$ term is set to 0, a curvature c is set to 0.125, and a conic constant k is set to 0. The coefficients of terms which are not written in Table 6 are all 0.

Figure 15A:
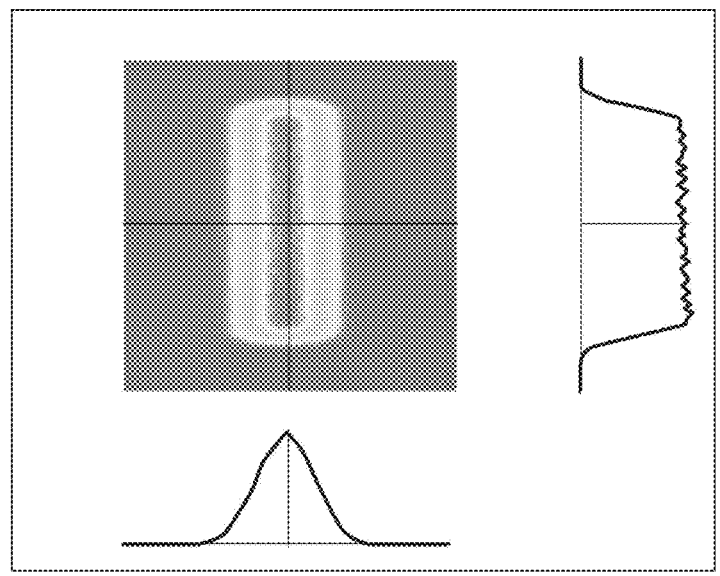
FIG. 15A is a diagram illustrating an illuminance distribution in a case where a spherical lens is used in Example 6.
Figure 15B:
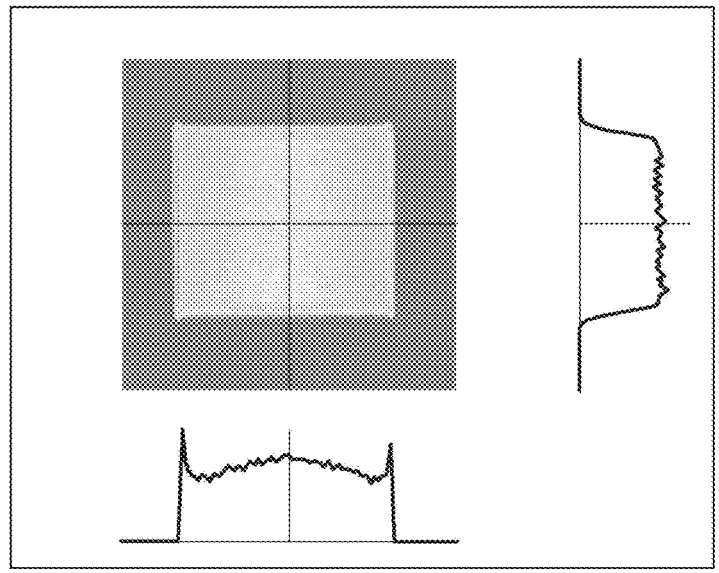
FIG. 15B is a diagram illustrating an illuminance distribution in a case where a free-form surface lens of Example 6 is used.

FIGS. 15A and 15B are diagrams illustrating the simulation results of Example 6. FIG. 15A is a diagram illustrating an illuminance distribution in a case where a spherical lens is used, as a comparison example, and FIG. 15B is a diagram illustrating an illuminance distribution in a case where a free-form surface lens having the above parameters is used. In FIGS. 15A and 15B, graphs shown on the lower side are the illuminance distribution of a region to be illuminated in a horizontal direction, and graphs shown on the right side are the illuminance distribution of the region to be illuminated in a vertical direction.

As shown in FIGS. 15A and 15B, in a case where the free-form surface lens satisfying the first condition and the fourth condition is used, a square spot having a uniform illuminance distribution is formed in the region to be illuminated. In this manner, from Example 6, it has been confirmed that, even in a case where the free-form surface lens is adopted which is easy of a shape design by satisfying the first condition and the fourth condition, it is possible to form the region to be illuminated in a square shape, and to make the illuminance distribution uniform.

In Examples 5 and 6, the coefficients of terms obtained by combining X and Y are all 0. In this case, since the curvatures of the lens can be independently designed in an x direction and a y direction, respectively, the design of the lens is facilitated.

The entire disclosure of Japanese Patent Application No. 2017-009613, filed Jan. 23, 2017 and Japanese Patent Application No. 2017-15-294, filed Aug. 2, 2017 are expressly incorporated by reference herein.

What is claimed is:

1. An illumination device comprising:
   a light source device including a first light-emitting element that emits a first pencil of rays; and
   a light shaping optical system including a first lens surface on which the first pencil of rays is incident,
   wherein the first lens surface includes a first free-form surface z represented by Expression (1) in which x and y are used as variables, m and n are integers equal to or greater than 0, $m_1$ and $n_1$ are respectively upper limits of m and n, k is a conic constant, c is a curvature, $c_j$ is a coefficient of $x^m y^n$, $j=[(m+n)^2+m+3n]/2+1$, $S=[(m_1+n_1)^2+m_1+3n_1]/2+1$, and $r=(x^2+y^2)^{1/2}$, and
   when m=2h and n=2h, where h is set to a positive integer in the Expression (1), a $C_j$ coefficient of an $x^{2h}$ term is different from a coefficient $C_j$ of a $y^{2h}$ term $$z = \frac{cr^2}{1+\sqrt{1-(1+k)c^2 r^2}} + \sum_{j=2}^{s} c_j x^m y^n. \tag{1}$$

2. The illumination device according to claim 1, wherein Expression (1) includes at least one of a first-order term of x and a first-order term of y, and
   the Expression includes at least one $x^p y^q$ term, in a case where p and q are set to positive integers.

3. The illumination device according to claim 2, wherein the light source device further includes a second light-emitting element that emits a second pencil of rays, the light shaping optical system further includes a second lens surface on which the second pencil of rays is incident, the second lens surface has a second free-form surface which is represented by Expression (1), the coefficient $C_j$ of the $x^{2h}$ term is different from the coefficient $C_j$ of the $y^{2h}$ term, with respect to the second free-form surface, and the light shaping optical system is configured to illuminate a region to be illuminated with the first pencil of rays and the second pencil of rays in a superposition manner.

4. The illumination device according to claim 3, further comprising a light source control device that controls an output of the first light-emitting element independently of an output of the second light-emitting element.

5. The illumination device according to claim 3, further comprising a condensing lens provided on an optical path of the first pencil of rays between the first light-emitting element and the first lens surface.

6. The illumination device according to claim 3, further comprising a wavelength conversion element,
   wherein a predetermined region of the wavelength conversion element is equivalent to the region to be illuminated.

7. The illumination device according to claim 1, wherein the light shaping optical system further includes a refractive surface that deflects a direction of travel of the first pencil of rays, and
   Expression (1) includes at least one $x^p y^q$ term, in a case where p and q are set to positive integers.

8. The illumination device according to claim 7, wherein a polynomial expression of Expression (1) is constituted by an even-ordered term of x and an even-ordered term of y.

9. The illumination device according to claim 7, wherein the refractive surface is a plane surface.

10. The illumination device according to claim 1, wherein the light shaping optical system further includes a reflection surface that reflects the first pencil of rays and deflects a direction of travel of the first pencil of rays, and
    Expression (1) includes at least one $x^p y^q$ term, in a case where p and q are set to positive integers.

11. The illumination device according to claim 10, wherein a polynomial expression of Expression (1) is constituted by an even-ordered term of x and an even-ordered term of y.

12. The illumination device according to claim 10, wherein the light shaping optical system has a light incident surface and a light emission surface,
    one of the light incident surface and the light emission surface is constituted by the first lens surface, and
    a principal ray of light of the first pencil of rays is incident on the other of the light incident surface and the light emission surface in a surface normal direction.

13. The illumination device according to claim 1, further comprising a condensing lens provided on an optical path of the first pencil of rays between the first light-emitting element and the first lens surface.

14. The illumination device according to claim 1, further comprising a wavelength conversion element on which the first pencil of rays transmitted through the light shaping optical system is incident.

15. A projector comprising:
    the illumination device according to claim 14;
    a light modulating device that modulates illumination light from the wavelength conversion element and generates image light in accordance with image information; and
    a projection optical system that projects the image light.

16. The illumination device according to claim 1, wherein the light source device further includes a second light-emitting element that emits a second pencil of rays,
    the light shaping optical system further includes a second lens surface on which the second pencil of rays is incident,
    the second lens surface has a second free-form surface which is represented by Expression (1),
    the coefficient $C_j$ of the $x^{2h}$ term is different from the coefficient $C_j$ of the $y^{2h}$ term, with respect to the second free-form surface, and
    the light shaping optical system is configured to cause the first pencil of rays and the second pencil of rays to be incident on regions to be illuminated which are different from each other.

17. The illumination device according to claim 16, further comprising a light source control device that controls an output of the first light-emitting element independently of an output of the second light-emitting element.

18. A projector comprising:
    the illumination device according to claim 17;
    a light modulating device that modulates illumination light from the illumination device in accordance with image information and generates image light; and
    a projection optical system that projects the image light,
    wherein the light source device further includes a third light-emitting element that emits a third pencil of rays,
    the light shaping optical system further includes a third lens surface on which the third pencil of rays is incident,
    the third lens surface has a third free-form surface which is represented by Expression (1),
    the coefficient $C_j$ of the $x^{2h}$ term is different from the coefficient $C_j$ of the $y^{2h}$ term, with respect to the third free-form surface,
    the light shaping optical system is configured to illuminate an entirety of the region to be illuminated with the third pencil of rays,
    the light source control device is configured to control an output of the third light-emitting element independently of at least one of an output of the first light-emitting element and an output of the second light-emitting element, and
    an image forming region of the light modulating device is equivalent to the region to be illuminated.

19. The illumination device according to claim 16, further comprising a wavelength conversion element,
    wherein a predetermined region of the wavelength conversion element is equivalent to the region to be illuminated.

20. A projector comprising:
    the illumination device according to claim 1;
    a light modulating device that modulates illumination light emitted from the illumination device in accordance with image information and generates image light; and
    a projection optical system that projects the image light,
    wherein an image forming region of the light modulating device is equivalent to the region to be illuminated.

* * * * *